(12) United States Patent
Ito

(10) Patent No.: US 12,093,469 B2
(45) Date of Patent: *Sep. 17, 2024

(54) INFORMATION PROCESSING APPARATUS AND CONTROL METHOD

(71) Applicant: Lenovo (Singapore) Pte. Ltd., Singapore (SG)

(72) Inventor: Yoshinori Ito, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,502

(22) Filed: Jul. 10, 2023

(65) Prior Publication Data

US 2024/0045510 A1    Feb. 8, 2024

(30) Foreign Application Priority Data

Aug. 8, 2022    (JP) .................. 2022-126527

(51) Int. Cl.
*G06F 1/16* (2006.01)
*G06F 3/02* (2006.01)
*G06F 3/147* (2006.01)

(52) U.S. Cl.
CPC .......... *G06F 3/0202* (2013.01); *G06F 1/1641* (2013.01); *G06F 1/1652* (2013.01); *G06F 1/1669* (2013.01); *G06F 3/147* (2013.01)

(58) Field of Classification Search
None
See application file for complete search history.

(56) References Cited

U.S. PATENT DOCUMENTS

| | | | |
|---|---|---|---|
| 11,899,851 B2* | 2/2024 | Ito | G06F 3/023 |
| 2010/0207888 A1* | 8/2010 | Camiel | G06F 1/1643 |
| | | | 345/168 |
| 2019/0042040 A1* | 2/2019 | Kumar | G06F 3/0412 |
| 2020/0333852 A1* | 10/2020 | Smith | G06F 1/1666 |
| 2024/0085991 A1* | 3/2024 | Ito | G06F 1/1652 |

FOREIGN PATENT DOCUMENTS

| | | |
|---|---|---|
| CN | 113795809 A | 12/2021 |
| JP | 2018-13850 A | 1/2018 |
| JP | 2019197253 A | 11/2019 |
| JP | 2020190940 A | 11/2020 |
| JP | 2021068100 A | 4/2021 |
| JP | 2022070081 A | 5/2022 |
| KR | 20220058185 A | 5/2022 |

* cited by examiner

*Primary Examiner* — Parul H Gupta
(74) *Attorney, Agent, or Firm* — Osha Bergman Watanabe & Burton LLP

(57) ABSTRACT

An information processing apparatus includes one foldable display having a first display mode in which the entire screen region is displayed and a second display mode in which a partial screen region excluding a predetermined screen region is displayed; determines whether an external keyboard is placed on the predetermined screen region; controls, in a first operation state, a first display mode where the keyboard is not placed and a second display mode where the keyboard is placed; and when a state is switched from the first operation state to a second operation state in which processing executed by the system is restricted more than in the first operation state, selects and controls a display mode when a next state is switched from the second operation state to the first operation state, and a previous display mode.

9 Claims, 18 Drawing Sheets

| | | STANDBY STATE/STOPPED STATE | NORMAL OPERATION STATE | |
|---|---|---|---|---|
| | NORMAL OPERATION STATE | STARTING → LOGIN → | | |
| | | LOGOUT/SHUTDOWN | | |
| | PREVIOUS DISPLAY MODE | SETTING OF DISPLAY MODE AT TIME OF NEXT STARTING | INITIAL DISPLAY MODE AT TIME OF STARTING | DISPLAY MODE AFTER LOGIN |
| FIRST SETTING | FULL-SCREEN MODE | FULL-SCREEN MODE | FULL-SCREEN MODE | CONNECTION OF KEYBOARD ⇒ HALF-SCREEN MODE |
| | HALF-SCREEN MODE | HALF-SCREEN MODE | HALF-SCREEN MODE | |
| SECOND SETTING | FULL-SCREEN MODE | FULL-SCREEN MODE | FULL-SCREEN MODE | |
| | HALF-SCREEN MODE | HALF-SCREEN MODE | HALF-SCREEN MODE | |
| THIRD SETTING | FULL-SCREEN MODE | FULL-SCREEN MODE | FULL-SCREEN MODE | NON-CONNECTION OF KEYBOARD ⇒ FULL-SCREEN MODE |
| | HALF-SCREEN MODE | HALF-SCREEN MODE | HALF-SCREEN MODE | |

FIG. 7

INFORMATION PROCESSING APPARATUS AND CONTROL METHOD

CROSS-REFERENCE TO RELATED APPLICATIONS

This application claims priority to Japanese Patent Application No. 2022-126527 filed on Aug. 8, 2022, the contents of which are hereby incorporated herein by reference in their entirety.

BACKGROUND OF THE INVENTION

Field of the Invention

The present invention relates to an information processing apparatus and a control method.

Description of the Related Art

In recent years, an information processing apparatus in which a foldable flexible display (display unit) is provided over a first chassis and a second chassis to be bendable according to rotation between the first chassis and the second chassis is also disclosed (refer to, for example, Japanese Unexamined Patent Application Publication No. 2018-13850). In a case where one display is provided over the first chassis and the second chassis, the information processing apparatus may be used in a one-screen mode with one display, and may also be used in a two-screen mode in which one display is divided into a screen region on the first chassis side and a screen region on the second chassis side in a pseudo manner.

Since the above information processing apparatus has one display provided over the first chassis and the second chassis, it is common that the information processing apparatus is not provided with a keyboard. However, an external keyboard is placed on and connected to one screen and the other screen is used as a display screen in a two-screen mode, so that a usage form can be the same as that of a laptop personal computer (PC) equipped with a keyboard. In this case, in the two-screen mode, a user's convenience is improved by automatically switching a screen mode to a screen mode in which the screen region on the side on which the external keyboard is placed is controlled to be displayed black, and the screen region on the other side is controlled to be displayed by half the size of the screen in the one-screen mode (hereinafter, referred to as a "half-screen mode").

However, when switching from the full-screen mode in which the entire screen region of the display is used as a display region to the half-screen mode, one screen region in the two-screen mode is not simply displayed black, and it is necessary to display the entire desktop screen including tool bars and the like in the other screen region (half-screen region). Therefore, it is necessary to change a resolution to a resolution to be equivalent to the half-screen region. This control of the change of a resolution can be performed only after logged in to a system at the time of starting depending on specifications of an operating system (OS). Thus, there is a problem in that, even if it is determined whether or not an external keyboard is connected at the time of starting, a resolution cannot be changed until a user logs in to the system, and the full-screen mode and the half-screen mode cannot be switched freely depending on whether or not the keyboard is connected.

For example, if a half screen region is displayed black in the half-screen mode even though the keyboard is not connected, there is a possibility that a user may suspect a failure, and thus, at the time of starting, control for returning to a display mode to the full-screen mode regardless of whether or not a keyboard is connected is also conceivable. However, for a user who frequently uses a keyboard, in a state in which the keyboard is connected, when the full-screen mode is performed, it is inconvenient because it is not possible to access content hidden by the keyboard unless the keyboard is removed. As described above, there has been a case where display on the display when an external keyboard is used cannot be appropriately controlled.

One or more embodiments of the invention provide an information processing apparatus and a control method for appropriately controlling display on a display when an external keyboard is used.

SUMMARY OF THE INVENTION

An information processing apparatus according to a first aspect of the present invention includes: one foldable display; a memory that temporarily stores a program of a system; and a processor that performs control based on the system by executing the program of the system stored in the memory, in which the processor performs an operation state control process of switching an operation state of the system between a first operation state and a second operation state in which some or all of processes executed by the system are restricted more than in the first operation state, a placement determination process of determining whether or not an external keyboard to be placed on a predetermined screen region of a screen region of the display is placed, a first control process of providing a first display mode in which the entire screen region of the display is controlled to be displayed as a display region, and a second display mode in which a part of the screen region of the display excluding the predetermined screen region is controlled to be displayed as a display region, and, in the first operation state, controlling a display mode to be the first display mode in a case of a non-placed state in which the keyboard is not placed and controlling a display mode to be the second display mode in a case of a placed state in which the keyboard is placed, and a second control process of, when a state is switched from the first operation state to the second operation state, selecting and controlling a display mode when a next state is switched from the second operation state to the first operation state from among the first display mode, the second display mode, and a previous display mode out of the first display mode and the second display mode.

In the information processing apparatus, the processor may further perform a display information control process of displaying, on the display, a selection screen for allowing a user to select a display mode selected in the second control process on the basis of any of a first setting for setting the first display mode, a second setting for setting the second display mode, and a third setting for setting a previous display mode out of the first display mode and the second display mode, and select, in the second control process, the display mode when the next state is switched from the second operation state to the first operation state on the basis of a setting selected through the user's operation on the selection screen from among the first setting, the second setting, and the third setting.

In the information processing apparatus, each time the processor may further perform a placement state accumulation process of determining whether or not the keyboard is in the placed state or the non-placed state and accumulates determination results to be stored each time a state is switched from the second operation state to the first operation state, and selects, in the second control process, as the display mode when the next state is switched from the second operation state to the first operation state, the second display mode in a case where a cumulative value of the placed state is greater than a cumulative value of the non-placed state, and selects the first display mode in a case where the cumulative value of the non-placed state is greater than the cumulative value of the placed state.

The information processing apparatus may further include a first sensor that detects an orientation of the information processing apparatus; and a second sensor that detects a folding angle of the display, in which the processor may further perform an estimation process of, when a state is switched from the first operation state to the second operation state, estimating a tendency when a user uses the information processing apparatus on the basis of at least any of whether or not the keyboard is in a placed state before the switching, and switching between the first display mode and the second display mode, the orientation of the information processing apparatus, and the folding angle of the display, and select, in the second control process, a display mode when a next state is switched from the second operation state to the first operation state on the basis of the tendency estimated in the estimation process.

In the information processing apparatus, the processor may further perform a time information acquisition process of acquiring current time information, and select, in the second control process, a display mode when a next state is switched from the second operation state to the first operation state on the basis of the current time information and a display mode set in advance for each time period out of the first display mode and the second display mode.

The information processing apparatus may further include a first sensor that detects an orientation of the information processing apparatus; and a second sensor that detects a folding angle of the display, in which the processor may select a display mode when a next state is switched from the second operation state to the first operation state by using a trained model that is subjected to machine learning on the basis of at least any information of whether or not the keyboard is in a placed state in the first operation state, switching between the first display mode and the second display mode, the orientation of the information processing apparatus, the folding angle of the display, and current time information, and a display mode selected after log in to the system after a state is switched from the second operation state to the first operation state out of the first display mode and the second display mode.

In the information processing apparatus, the processor may perform additional machine learning on the trained model on the basis of a status of switching between display modes after a state is switched from the second operation state to the first operation state in a display mode controlled when a previous state is switched from the first operation state to the second operation state.

In the information processing apparatus, when a state is switched from the second operation state to the first operation state, the processor may control display on the display in a display mode controlled when a previous state is switched from the first operation state to the second operation state.

According to a second aspect of the present invention, there is provided a control method in an information processing apparatus including one foldable display, a memory that temporarily stores a program of a system, and a processor that performs control based on the system by executing the program of the system stored in the memory, the control method including causing the processor to execute a step of switching an operation state of the system between a first operation state and a second operation state in which some or all of processes executed by the system are restricted more than in the first operation state; a step of determining whether or not an external keyboard to be placed on a predetermined screen region of a screen region of the display is placed; a step of providing a first display mode in which the entire screen region of the display is controlled to be displayed as a display region, and a second display mode in which a part of the screen region of the display excluding the predetermined screen region is controlled to be displayed as a display region, and, in the first operation state, controlling a display mode to be the first display mode in a case of a non-placed state in which the keyboard is not placed and controlling a display mode to be the second display mode in a case of a placed state in which the keyboard is placed; and a step of, when a state is switched from the first operation state to the second operation state, selecting and controlling a display mode when a next state is switched from the second operation state to the first operation state from among the first display mode, the second display mode, and a previous display mode out of the first display mode and the second display mode.

The above-described aspects of the present invention can appropriately control display on a display when an external keyboard is used.

BRIEF DESCRIPTION OF THE DRAWINGS

FIG. 7 is a diagram illustrating an example of a display mode setting at the time of starting according to the first embodiment.

DETAILED DESCRIPTION OF THE INVENTION

Hereinafter, one or more embodiments of the present invention will be described with reference to the drawings.

First Embodiment

First, a first embodiment will be described.

Figure 1:
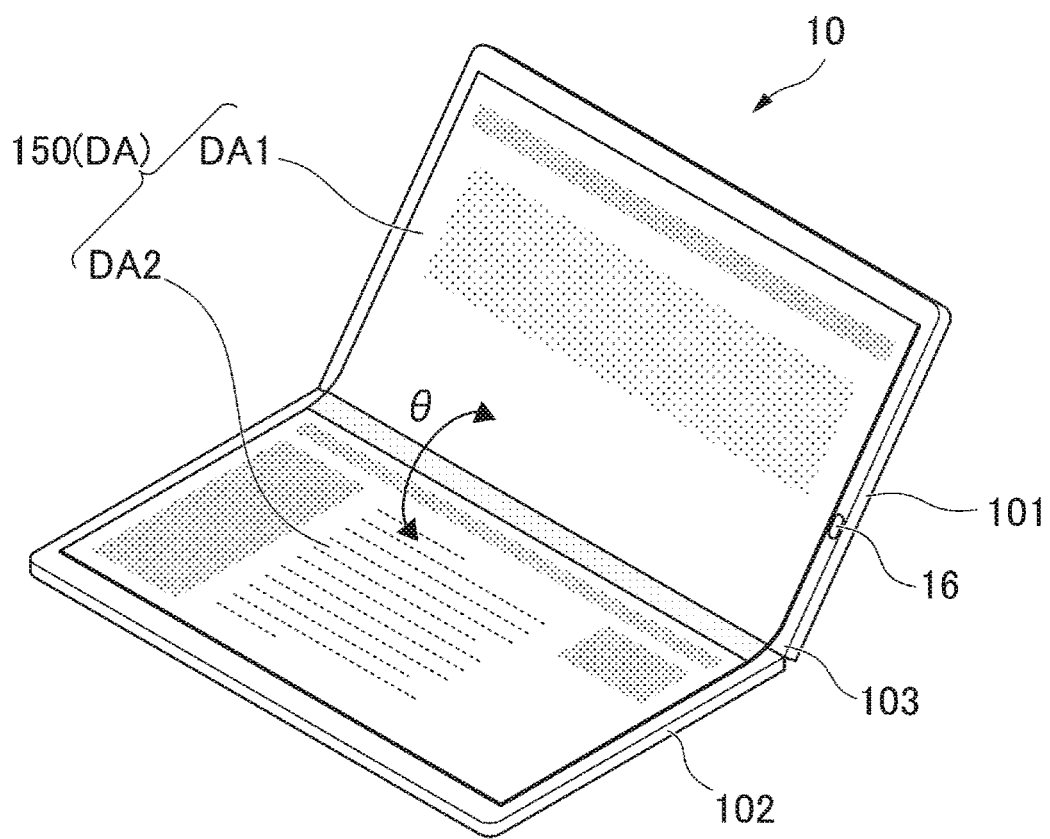
FIG. 1 is a perspective view illustrating an external appearance of an information processing apparatus according to a first embodiment.

FIG. 1 is a perspective view illustrating an external appearance of an information processing apparatus according to the first embodiment. The information processing apparatus 10 according to the first embodiment is a clamshell type (laptop type) personal computer (PC). The information processing apparatus 10 includes a first chassis 101, a second chassis 102, and a hinge mechanism 103. The first chassis 101 and the second chassis 102 are substantially quadrangular plate-shaped (for example, flat plate-shaped) chassis. One of side surfaces of the first chassis 101 and one of side surfaces of the second chassis 102 are coupled (connected) via the hinge mechanism 103, and the first chassis 101 and the second chassis 102 are relatively rotatable around a rotation axis formed by the hinge mechanism 103. A state in which an opening angle θ around the rotation axis of the first chassis 101 and the second chassis 102 is approximately 0° is a state in which the first chassis 101 and the second chassis 102 overlap each other and are closed. A state in which the first chassis 101 and the second chassis 102 are closed will be referred to as a "closed state (closed)". In the closed state, surfaces of the first chassis 101 and the second chassis 102 facing each other will be referred to as "inner surfaces", and surfaces opposite to the inner surface will be referred to as "outer surfaces". The opening angle θ can also be said to be an angle formed by the inner surface of the first chassis 101 and the inner surface of the second chassis 102. A state in which the first chassis 101 and the second chassis 102 are opened relative to the closed state will be referred to as an "open state". The open state is a state in which the first chassis 101 and the second chassis 102 are relatively rotated until the opening angle θ becomes larger than a preset threshold value (for example, 10°).

The information processing apparatus 10 includes a camera 16 and a display 150. The camera 16 is provided on the inner surface of the first chassis 101. The display 150 is provided from the inner surface of the first chassis 101 to the inner surface of the second chassis 102. The camera 16 is provided in, for example, an outer portion of a screen region of the display 150 on the inner surface of the first chassis 101, and can image a user or the like present on the side facing the display 150. The display 150 is a flexible display that can be bent according to the opening angle θ due to relative rotation of the first chassis 101 and the second chassis 102 (refer to FIGS. 2 and 3). As the flexible display, an organic EL display or the like is used. The information processing apparatus 10 can not only control to display the entire screen region of the display 150 as one screen region DA, that is, as one screen configuration but also control to display the entire screen region of the display 150 as two divided screen regions such as a first screen region DA1 and a second screen region DA2, that is, as a two-screen configuration. Here, the first screen region DA1 and the second screen region DA2 are screen regions that do not overlap each other. Here, out of the screen regions of the display 150, the screen region corresponding to the inner surface side of the first chassis 101 is the first screen region DA1, and the screen region corresponding to the inner surface side of the second chassis 102 is the second screen region DA2. Hereinafter, a display mode in which the display is controlled as the one-screen configuration will be referred to as a "one-screen mode", and a display mode in which the display is controlled as the two-screen configuration will be referred to as a "two-screen mode".

A touch sensor is provided on the screen region of the display 150. The information processing apparatus 10 can detect a touch operation on the screen region of the display 150. By bringing the information processing apparatus 10 into an open state, a user can visually recognize display of the display 150 provided on the inner surface of each of the first chassis 101 and the second chassis 102, or can perform a touch operation on the display 150, and can thus use the information processing apparatus 10.

Next, a usage form and a screen mode of the information processing apparatus 10 will be described in detail. First, as a usage form of the information processing apparatus 10, there are a state (bent form) in which the first chassis 101 and the second chassis 102 are bent depending on the opening angle θ between the first chassis 101 and the second chassis 102, and a flat state (flat form) in which the first chassis 101 and the second chassis 102 are not bent. In the following description, a state (bent form) in which the first chassis 101 and the second chassis 102 are bent will be simply referred to as a "bent state (bent form)", and a flat state (flat form) in which the first chassis 101 and the second chassis 102 are not bent will be simply referred to as a "flat state (flat form)". In the bent state (bent form), the display 150 provided over the first chassis 101 and the second chassis 102 is also in a bent state. In the flat state (flat form), the display 150 is also in a flat state.

Figure 2:
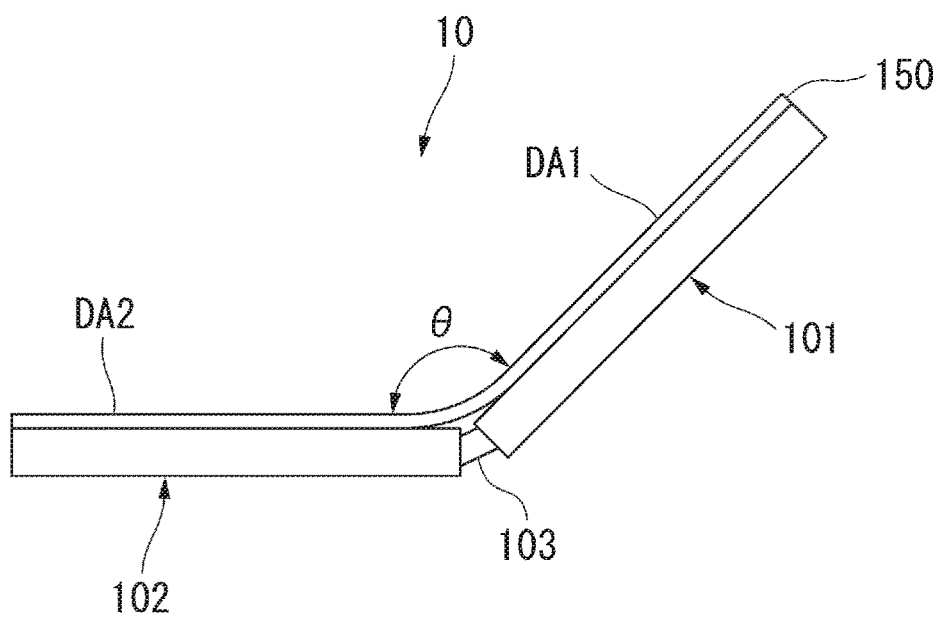
FIG. 2 is a side view illustrating an example of the information processing apparatus in a bent state according to the first embodiment.

FIG. 2 is a side view illustrating an example of the information processing apparatus 10 in the bent state (bent form). The display 150 is disposed over (across) the first chassis 101 and the second chassis 102. The screen region of the display 150 (the screen region DA illustrated in FIG. 1) can be bent with a portion corresponding to the hinge mechanism 103 as a crease, and the screen region on the first chassis 101 side is illustrated as the first screen region DA1 and the screen region on the second chassis 102 side is illustrated as the second screen region DA2 with the crease as a boundary. The display 150 is bent according to rotation (opening angle θ) between the first chassis 101 and the second chassis 102. It is determined whether or not the information processing apparatus 10 is in a bent state (bent form) according to the opening angle θ. As an example, in a case of 10°<θ<170°, it is determined that the information processing apparatus 10 is in a bent state (bent form). This state corresponds to a usage form such as a so-called clamshell mode or book mode.

Figure 3:
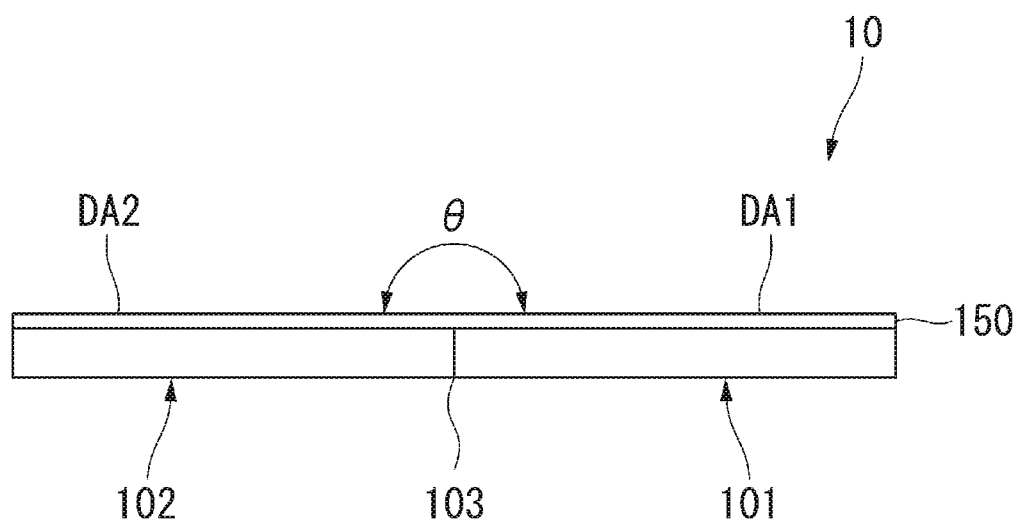
FIG. 3 is a side view illustrating an example of an information processing apparatus in a flat state according to a first embodiment.

FIG. 3 is a side view illustrating an example of the information processing apparatus 10 in a flat state (flat form). It is typically determined that the information processing apparatus 10 is in a flat state (flat form) in a case where the opening angle θ is 180°, but as an example, in a case of 170°≤θ≤180°, it may be determined that the information processing apparatus 10 is in a flat state (flat form). For example, in a case where the opening angle θ between the first chassis 101 and the second chassis 102 is 180°, the display 150 is also in a flat state. This state corresponds to a usage form called a so-called tablet mode.

Next, with reference to FIG. 4, display modes according to various usage forms of the information processing apparatus 10 will be described in detail.

Figure 4:
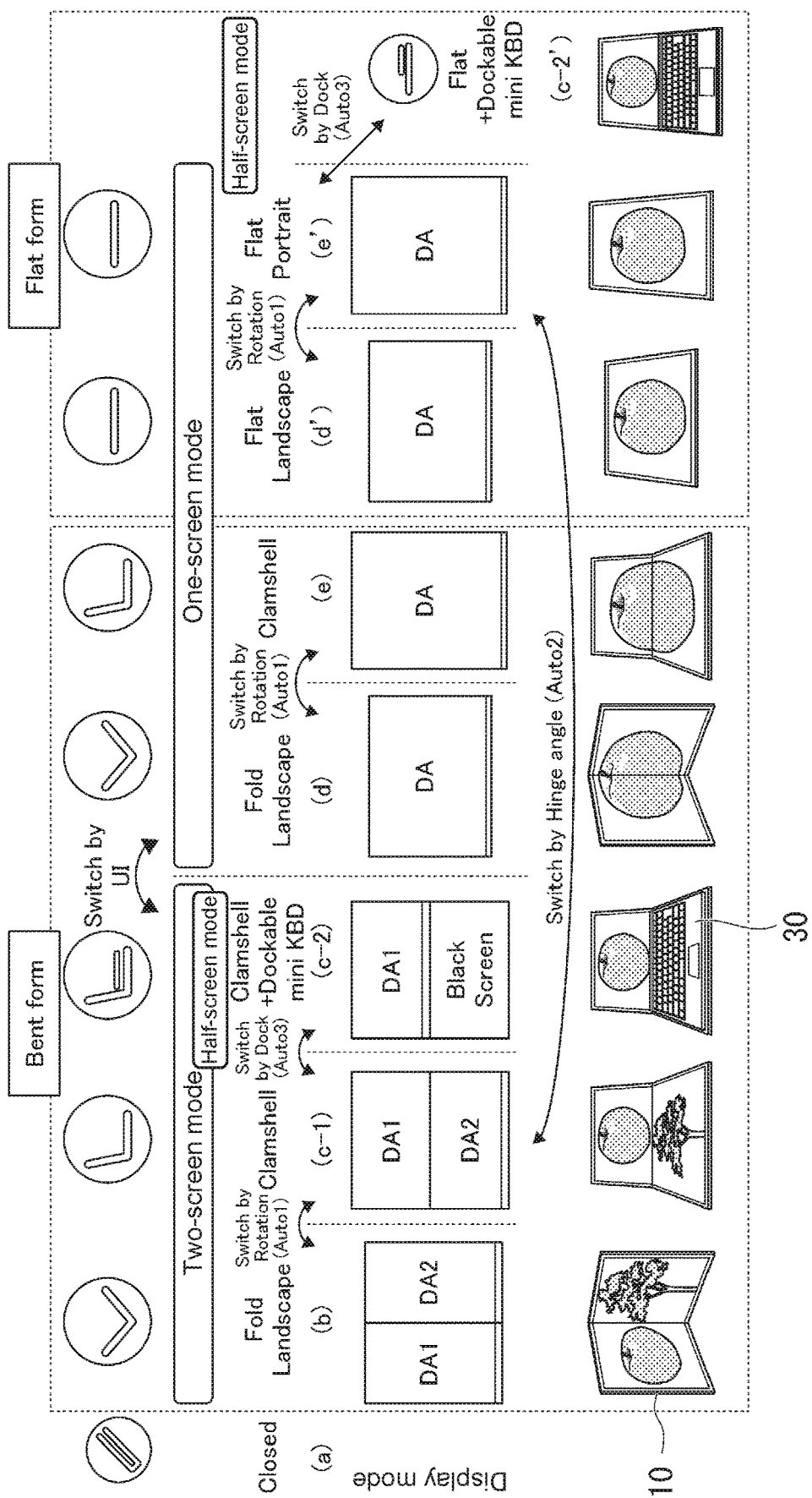
FIG. 4 is a diagram illustrating specific examples of various display modes of the information processing apparatus according to the first embodiment.

FIG. 4 is a diagram illustrating specific examples of various display modes of the information processing apparatus 10 according to the first embodiment. The information processing apparatus 10 has different display modes according to usage forms classified depending on the opening angle θ between the first chassis 101 and the second chassis 102, an attitude (orientation) of the information processing apparatus 10, whether a screen mode is a one-screen mode or a two-screen mode, and the like. One screen will also be referred to as a single screen, and two screens will also be referred to as split screens or dual screens.

The display mode (a) is a display mode when the first chassis 101 and the second chassis 102 are in a closed state (closed) as a usage form. For example, in this closed state, the information processing apparatus 10 is in a standby state such as a sleep state or a hibernation state (hibernation), and the display 150 is in a display-off state. The standby state such as the sleep state or the hibernation state (hibernation) corresponds to S3 or S4 of the power supply state of the system defined by, for example, Advanced Configuration and Power Interface (ACPI).

In the closed state, the information processing apparatus 10 may be in a stopped state. The stopped state is a state in which the system is shut down and the power is turned off, and is, for example, a state corresponding to S5 defined by ACPI. The standby state and the stopped state are states in which some or all of processes performed by the system are restricted with respect to a normal operation state. The normal operation state is an operation state after the system has started and a user logs in, and is an operation state in which processes can be executed by the system without any particular restriction. The normal operation state corresponds to, for example, the S0 state defined by ACPI. Subsequently, a display mode when the first chassis 101 and the second chassis 102 are in an open state will be described.

The display mode (b) is a display mode when a usage form is a bent state (bent form), and is a two-screen mode in which display control is performed such that the screen region of the display 150 is divided into two screen regions such as the first screen region DA1 and the second screen region DA2. The orientation of the information processing apparatus 10 is an orientation in which the first screen region DA1 and the second screen region DA2 are arranged horizontally side by side in a vertical orientation. The vertical orientation of the screen region means that the long side of the four sides of the rectangular screen region is in the vertical direction and the short side is in the horizontal direction. In a case where the screen region is in the vertical orientation, a display orientation is also a vertical orientation, and display is performed such that the direction along the long side corresponds to the vertical direction and the direction along the short side corresponds to the horizontal direction. This usage form is a usage form in which left and right pages when a book is opened correspond to the left and right screens, and corresponds to a so-called book mode. This usage form is also referred to as "fold landscape" because a screen region obtained by combining the first screen region DA1 and the second screen region DA2 side by side in a bent state (bent form) is horizontally long.

In this display mode (b), for example, in a normal operation state, the information processing apparatus 10 is in a two-screen display mode in which the first screen region DA1 on the left serves as a primary screen and the second screen region DA2 on the right serves as a secondary screen. In the display mode (b), a correspondence relationship between the first screen region DA1 and the second screen region DA2 and the primary screen and the secondary screen may be reversed.

Similar to the display mode (b), the display mode (c−1) is a display mode when a usage form is a bent state (bent form), and is a two-screen mode in which display control is performed such that the screen region of the display 150 is divided into two screen regions such as the first screen region DA1 and the second screen region DA2, but an orientation of the information processing apparatus 10 is different. The orientation of the information processing apparatus 10 is an orientation in which the first screen region DA1 and the second screen region DA2 are arranged vertically side by side in a horizontal orientation. The horizontal orientation of the screen region means that the long side of the four sides of the rectangular screen region is in the horizontal direction and the short side is in the vertical direction. In a case where the screen region is in the horizontal orientation, a display orientation is also a horizontal orientation, and display is performed such that the direction along the short side corresponds to the vertical direction and the direction along the long side corresponds to the horizontal direction. This usage form is one of general usage forms of a clamshell type PC.

In this display mode (c−1), for example, in a normal operation state, the information processing apparatus 10 is in a two-screen display mode in which the first screen region DA1 serves as a primary screen and the second screen region DA2 serves as a secondary screen. In the display mode (c−1), a correspondence relationship between the first screen region DA1 and the second screen region DA2 and the primary screen and the secondary screen may be reversed.

For example, the information processing apparatus 10 detects a change in an attitude (orientation) of the information processing apparatus 10, and thus automatically switches from the display mode (b) to the display mode (c−1) or from the display mode (c−1) to the display mode (b) (Switch by Rotation). For example, since the display mode (c−1) is a state in which the display 150 is rotated 90 degrees rightward with respect to the display mode (b) as illustrated, when it is detected that the information processing apparatus 10 is rotated rightward from the display mode (b) by a predetermined angle (for example, 45 degrees) or more, the mode is switched to the display mode (c−1). Since the display mode (b) is a state in which the display 150 is rotated 90 degrees to leftward with respect to the display mode (c-1) as illustrated, when it is detected that the information processing apparatus 10 is rotated leftward from the display mode (c-1) by a predetermined angle (for example, 45 degrees) or more, the mode is switched to the display mode (b).

Similar to the display mode (c-1), the display mode (c-2) is a bent state (bent form) and a mode in which an orientation of the information processing apparatus 10 is the same, but is different therefrom in that an external keyboard 30 (dockable mini keyboard (KBD)) that can be placed on the information processing apparatus 10 is placed at a predetermined position. This usage form is a state in which the physical keyboard 30 is connected in a general usage form of a clamshell type PC. For example, in the first embodiment, the keyboard 30 has almost the same size as that of the second screen region DA2 and is configured to be able to be placed on the second screen region DA2. The keyboard 30 may be a keyboard that occupies a smaller region than that of the second screen region DA2. As an example, the keyboard 30 is provided with a magnet inside (end portion) of a bottom surface thereof, and when placed on the second screen region DA2, the keyboard 30 is attracted and fixed to a bezel portion of the inner surface end portion of the second chassis 102. As a result, the usage form is the same as that of a conventional clamshell type PC that is originally provided with a physical keyboard. The information processing apparatus 10 and the keyboard 30 are connected by, for example, Bluetooth (registered trademark). In this display mode (c-2), the information processing apparatus 10 controls the second screen region DA2 to be displayed black or turned off because the second screen region DA2 cannot be visually recognized due to the keyboard 30. That is, this display mode (c-2) is a display mode (hereinafter, referred to as a "half-screen mode") in which only one screen region that is a half of the screen region of the display 150 is effective for display, and is a one-screen mode using only the first screen region DA1. That is, the half-screen mode is a display mode in which display control is performed such that a partial screen region (first screen region DA1) excluding the screen region (second screen region DA2) on the side on which the keyboard 30 is placed from the screen region (screen region DA) of the display 150 is used as a screen region.

For example, when the information processing apparatus 10 detects a connection with an external keyboard in the state of the display mode (c-1), the information processing apparatus 10 automatically switches from the display mode (c-1) to the display mode (c-2) (Switch by Dock).

Similar to the display mode (b), the display mode (d) is a bent state (bent form), and a mode in which an orientation of the information processing apparatus 10 is the same, but is different therefrom because display control is performed to provide a one-screen mode in which the entire screen region of the display 150 is used as one screen region DA. This usage form is different from the display mode (b) in that a one-screen mode is provided, but will also be referred to as "fold landscape" because the display mode is a bent state (bent form) and the screen region DA is horizontally long. The screen region DA is in a horizontal orientation, and a display orientation is also a horizontal orientation.

Here, switching the one-screen mode and the two-screen mode in the bent state (bent form) is performed, for example, by a user operation. For example, the information processing apparatus 10 displays an operator as a user interface (UI) capable of switching the one-screen mode and the two-screen mode at any location on the screen, and switches from the display mode (b) to the display mode (d) on the basis of an operation on the operator (Switch by UI). Specific examples of this display mode switching operation will be described later.

Similar to the display mode (c-1), the display mode (e) is a bent state (bent form) and is a mode in which an orientation of the information processing apparatus 10 is the same, but is different therefrom because display control is performed to provide a one-screen mode in which the entire screen region of the display 150 is used as one screen region DA. This usage form is different from the display mode (c-1) in that a one-screen mode is provided, but corresponds to a usage form of a clamshell type PC from a bent state (bent form) and an orientation of the information processing apparatus 10. The screen region DA is in a vertical orientation, and a display orientation is also a vertical orientation.

For example, the information processing apparatus 10 detects a change in an attitude (orientation) of the information processing apparatus 10, and thus automatically switches from the display mode (d) to the display mode (e) or from the display mode (e) to the display mode (d) (Switch by Rotation). For example, since the display mode (e) is a state in which the display 150 is rotated 90 degrees rightward with respect to the display mode (d) as illustrated, when it is detected that the information processing apparatus 10 is rotated rightward from the state of the display mode (d) by a predetermined angle (for example, 45 degrees) or more, the mode is switched to the display mode (e). Since the display mode (d) is a state in which the display 150 is rotated 90 degrees leftward with respect to the display mode (e) as illustrated, when it is detected that the information processing apparatus 10 is rotated leftward from the state of the display mode (e) by a predetermined angle (for example, 45 degrees) or more, the mode is switched to the display mode (d).

Similar to the display mode (d), the display mode (d') is a one-screen mode, and is a mode in which an orientation of the information processing apparatus 10 is an orientation in which the screen region DA is horizontally long, but is different therefrom in that is a flat state (flat form) is provided. The flat state (flat form) is a state in which the opening angle θ between the first chassis 101 and the second chassis 102 is about 180°. This usage form corresponds to the so-called tablet mode described with reference to FIG. 3, and will also be referred to as "flat landscape" because a flat state (flat form) is provided and the screen region DA is horizontally long. This display mode (d') is different from the display mode (d) only in the opening angle θ between the first chassis 101 and the second chassis 102. Similar to the display mode (d), the screen region DA is in a horizontal orientation, and the display orientation is also in a horizontal orientation.

Similar to the display mode (e), the display mode (e') is a one-screen mode, and is a mode in which an orientation of the information processing apparatus 10 is also the orientation in which the screen region DA is vertically long, but is different therefrom in that a flat state (flat form) is provided. This usage form will also be referred to as "flat portrait" because a flat state (flat form) is provided and the screen region DA is vertically long. This display mode (e') is different from the display mode (e) only in the opening angle θ between the first chassis 101 and the second chassis 102. Similar to the display mode (e), the screen region DA is in a vertical orientation, and a display orientation is also a vertical orientation.

For example, the information processing apparatus 10 detects a change in an attitude (orientation) of the information processing apparatus 10, and thus automatically switches from the display mode (d') to the display mode (e') or from the display mode (e') to the display mode (d') (Switch by Rotation). For example, since the display mode (e') is a state in which the display 150 is rotated 90 degrees rightward with respect to the display mode (d') as illustrated, when it is detected that the information processing apparatus 10 is rotated rightward from the state of the display mode (d') by a predetermined angle (for example, 45 degrees) or more, the mode is switched to the display mode (e'). Since the display mode (d') is a state in which the display 150 is rotated 90 degrees leftward with respect to the display mode (e') as illustrated, when it is detected that the information processing apparatus 10 is rotated leftward from the state of the display mode (e') by a predetermined angle (for example, 45 degrees) or more, the mode is switched to the display mode (d').

In the display mode (d') and the display mode (e'), the user can operate the display mode switching icon described above to switch to the two-screen mode while maintaining a flat state (flat form). For example, when the state of the display mode (d') is switched to the two-screen mode, a display state is the same as that in the display mode (b) in the flat state (flat form). When the state of the display mode (e') is switched to the two-screen mode, a display state is the same as that in the display mode (c−1) in the flat state (flat form).

When the information processing apparatus 10 detects a connection with the keyboard 30 in the state of the display mode (e'), the information processing apparatus 10 automatically switches from the display mode (e') to the display mode (c−2') (Switch by Dock). The display mode (c−2') is a flat state (flat form), and is different from the display mode (c−2) only in the opening angle θ between the first chassis 101 and the second chassis 102. In this display mode (c−2'), the information processing apparatus controls the second screen region DA2 to be displayed black or turned off because the second screen region DA2 cannot be visually recognized due to the keyboard 30. That is, this display mode (c−2') is a half-screen mode in which, as in the display mode (c−2), only one screen region that is a half of the screen region of the display 150 is effective for display.

In a case where the information processing apparatus has detected a change from a flat state (flat form) to a bent state (bent form), the information processing apparatus 10 can be configured to switch from a one-screen mode to a two-screen mode. For example, in a case where a change to a bent state (bent form) in the state of the display mode (d') has been detected on the basis of the opening angle θ between the first chassis 101 and the second chassis 102, the information processing apparatus 10 automatically switches from the display mode (d') to the display mode (b). In a case where a change to a bent state (bent form) in the state of the display mode (e') has been detected on the basis of the opening angle θ between the first chassis 101 and the second chassis 102, the information processing apparatus 10 automatically switches from the display mode (e') to the display mode (c−1).

(Configuration of Information Processing Apparatus 10)

Hereinafter, a specific configuration of the information processing apparatus 10 will be described.

Figure 5:
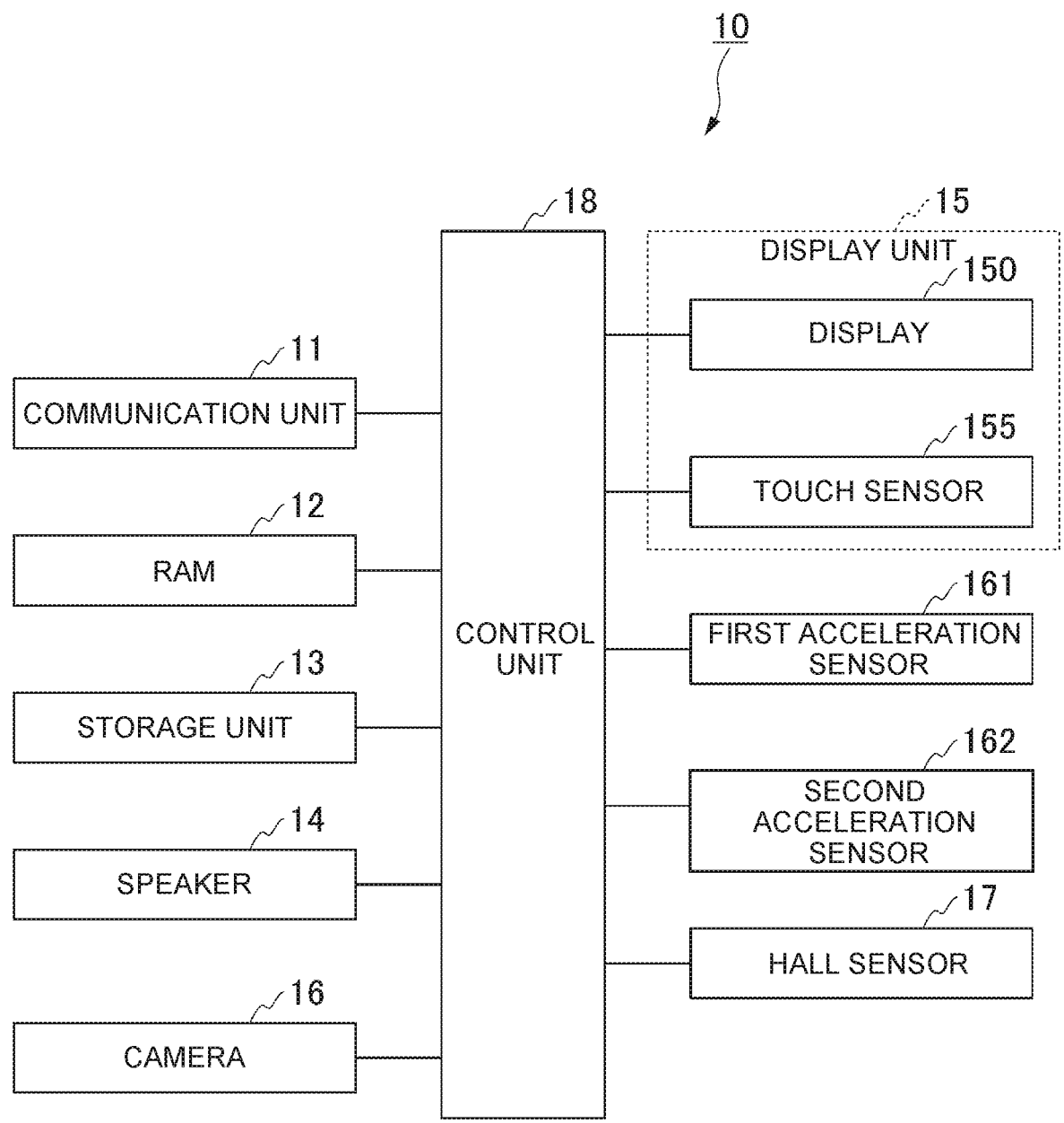
FIG. 5 is a block diagram illustrating an example of a hardware configuration of the information processing apparatus according to the first embodiment.

FIG. 5 is a block diagram illustrating an example of a hardware configuration of the information processing apparatus 10 according to the first embodiment. The information processing apparatus 10 includes a communication unit 11, a random access memory (RAM) 12, a storage unit 13, a speaker 14, a display unit 15, a camera 16, a first acceleration sensor 161, a second acceleration sensor 162, a hall sensor 17, and a control unit 18. These constituents are communicatively connected to each other via a bus or the like.

The communication unit 11 includes digital input/output ports such as a plurality of Ethernet (registered trademark) ports or a plurality of Universal Serial Bus (USB) ports, and a communication device that performs wireless communication such as Bluetooth (registered trademark) or Wi-Fi (registered trademark). For example, the communication unit 11 can communicate with the external keyboard 30 and the like described above by using Bluetooth (registered trademark).

A program or data for processing executed by the control unit 18 is loaded in the RAM 12, and various types of data are stored or deleted as appropriate. For example, the RAM 12 also functions as a video memory (V-RAM) that temporarily stores display data to be displayed on the display 150. As an example, the RAM 12 functions as a video memory of data displayed in the screen region DA when the display 150 is controlled in a one-screen mode. The RAM 12 functions as a video memory of data displayed in the first screen region DA1 and the second screen region DA2 when the display 150 is controlled in a two-screen mode. The RAM 12 functions as a video memory of data displayed in the first screen region DA1 when the display 150 is controlled in the half-screen mode. Since the RAM 12 is a volatile memory, the data is not stored when the supply of power to the RAM 12 is stopped. The data that needs to be stored when the supply of power to the RAM 12 is stopped is transferred to the storage unit 13.

The storage unit 13 includes one or more of a solid state drive (SSD), a hard disk drive (HDD), a read only memory (ROM), a Flash-ROM, and the like. For example, the storage unit 13 stores a basic input output system (BIOS) program and setting data, an operating system (OS), a program of an application running on the OS, various data used in the application, and the like.

The speaker 14 outputs electronic sounds, voices, or the like.

The display unit 15 includes a display 150 and a touch sensor 155. As described above, the display 150 is a flexible display that can be bent according to the opening angle θ due to relative rotation of the first chassis 101 and the second chassis 102. The display 150 performs display corresponding to each display mode described with reference to FIG. 4, according to the control of the control unit 18. The touch sensor 155 is provided on the screen of the display 150, and detects a touch operation with respect to the screen. For example, the touch sensor 155 detects a touch operation on the screen region DA in the one-screen mode. The touch sensor 155 detects a touch operation on one or both of the first screen region DA1 and the second screen region DA2 in the two-screen mode. The touch operation includes a tap operation, a slide operation, a flick operation, a swipe operation, a pinch operation, and the like. The touch sensor 155 detects a touch operation and outputs operation information on the basis of the detected operation to the control unit 18.

The camera 16 includes a lens, an imaging element, and the like. The camera 16 captures an image (a still image or a moving image) according to the control of the control unit 18, and outputs data of the captured image.

The first acceleration sensor 161 is provided inside the first chassis 101, and detects an orientation of the first chassis 101 and a change in the orientation. For example, assuming that a direction parallel to the longitudinal direction of the first screen region DA1 is an X1 direction, a direction parallel to the lateral direction is a Y1 direction, and a direction perpendicular to the X1 direction and the Y1 direction is a Z1 direction, the first acceleration sensor 161 detects respective accelerations in the X1 direction, the Y1 direction, and the Z1 direction, and outputs the detection results to the control unit 18.

The second acceleration sensor 162 is provided inside the second chassis 102, and detects an orientation of the second chassis 102 and a change in the orientation. For example, assuming that a direction parallel to the longitudinal direction of the second screen region DA2 is an X2 direction, a direction parallel to the lateral direction is a Y2 direction, and a direction perpendicular to the X2 direction and the Y2 direction is a Z2 direction, the second acceleration sensor 162 detects respective accelerations in the X2 direction, the Y2 direction, and the Z2 direction, and outputs the detection results to the control unit 18.

The hall sensor 17 is provided to detect a connection of the keyboard 30. For example, when the keyboard 30 is placed on the second screen region DA2 of the second chassis 102, a magnetic field changes due to approaching of the magnet provided inside the bottom surface of the keyboard 30, and a detected value (output value) from the hall sensor 17 changes. That is, the hall sensor 17 outputs different detection results depending on whether or not the keyboard 30 is placed.

The control unit 18 includes a processor such as a central processing unit (CPU), a graphic processing unit (GPU), or a microcomputer, and realizes various functions by the processor executing programs (various programs such as a BIOS, an OS, and applications running on the OS) stored in the storage unit 13 or the like. For example, the control unit 18 detects an attitude (orientation) of the information processing apparatus 10 on the basis of the detection results from the first acceleration sensor 161 and the second acceleration sensor 162. The control unit 18 detects, on the basis of the detection results from the first acceleration sensor 161 and the second acceleration sensor 162, whether the information processing apparatus 10 is in an open state or a closed state, and whether the information processing apparatus 10 is in a bent state (bent form) or a flat state (flat form) in the open state, or the like. The control unit 18 detects whether or not the keyboard 30 is connected (that is, whether or not the keyboard 30 is placed).

For example, in a normal operation state, the control unit 18 controls switching of the display modes illustrated in FIG. 4 on the basis of an attitude (orientation) of the information processing apparatus 10, whether the information processing apparatus 10 is in a bent state (bent form) or a flat state (flat form), whether or not the keyboard 30 is connected (that is, whether or not the keyboard 30 is placed), and the like. In the following description, a state in which the information processing apparatus 10 and the keyboard 30 are connected will be referred to as a "connected state", and a state in which the information processing apparatus 10 and the keyboard 30 are not connected will be referred to as a "non-connected state". The "connected state" is a state in which the keyboard 30 is placed on the second screen region DA2 (placed state). On the other hand, the "non-connected state" is a state in which the keyboard 30 is not placed on the second screen region DA2 (non-placed state).

Figure 6:
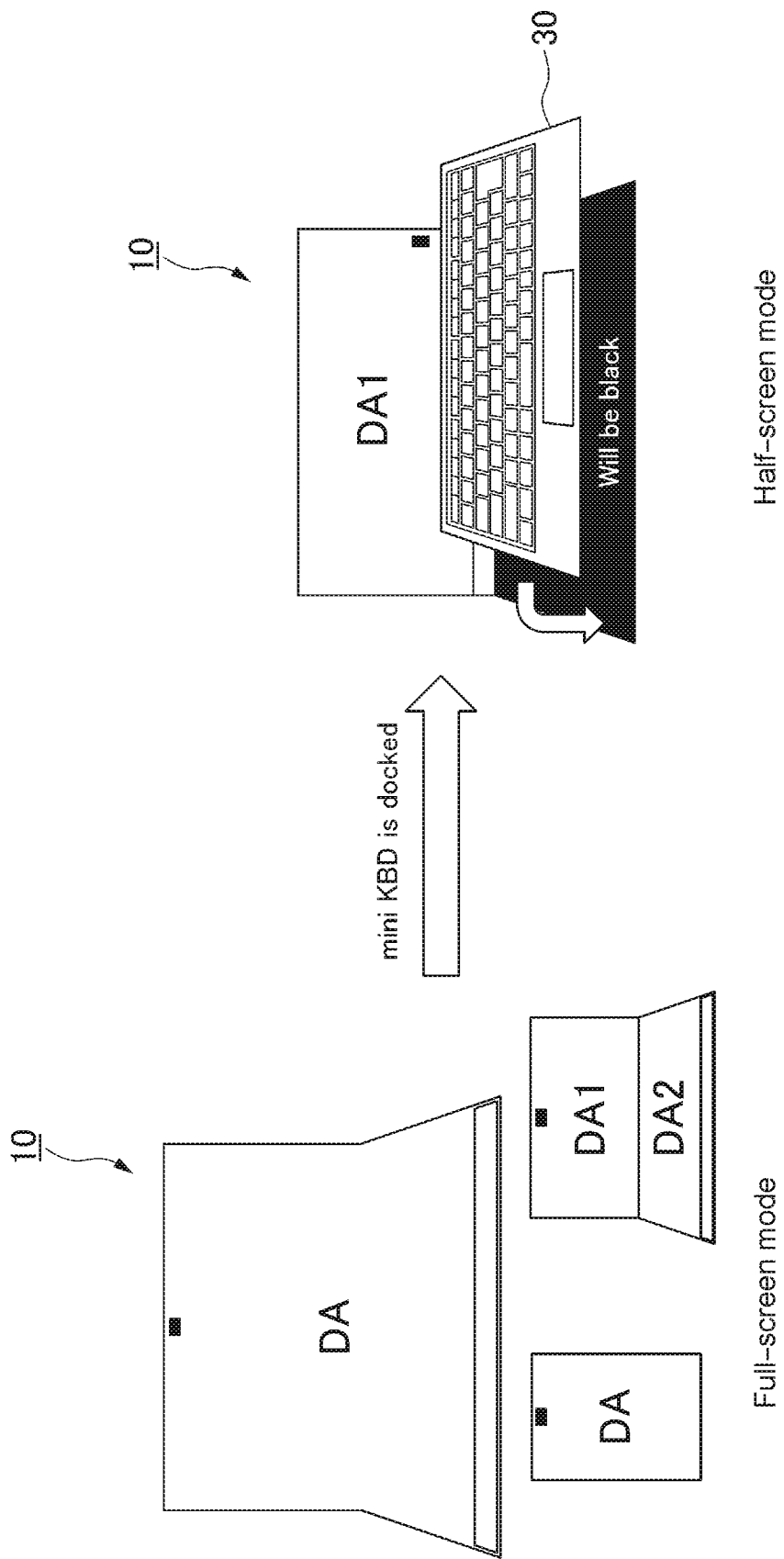
FIG. 6 is a diagram illustrating an example of switching display modes due to connection to a keyboard according to the first embodiment.

FIG. 6 is a diagram illustrating an example of switching display modes due to connection with the keyboard 30 according to the first embodiment. As described in FIG. 4, when connection with the keyboard 30 is detected in a state of the one-screen mode or the two-screen mode, the mode is switched to the half-screen mode. The one-screen mode and the two-screen mode are different in that the entire screen region of the display 150 is controlled to be displayed as one screen region DA or is controlled to be displayed as two screen regions such as the first screen region DA1 and the second screen region DA2, but are display modes in which the entire screen region of the display 150 is used as a display region. Therefore, the one-screen mode and the two-screen mode will be referred to as a full-screen mode with respect to the half-screen mode.

Here, when the mode is switched from the full-screen mode to the half-screen mode, one screen region (second screen region DA2) in the two-screen mode is not simply displayed black, and it is necessary to display the entire desktop screen including tool bars and the like in the other screen region (first screen region DA1). Therefore, it is necessary to change a resolution to a resolution to be equivalent to the half-screen region. This control of the change of a resolution can be performed only after logged in to a system at the time of starting depending on specifications of an OS. Thus, even if it is determined whether or not the keyboard 30 is connected at the time of starting, a resolution cannot be changed until a user logs in to the system, and the full-screen mode and the half-screen mode cannot be switched freely depending on whether or not the keyboard 30 is connected.

Therefore, in the first embodiment, at the time of starting from a standby state or a stopped state, a setting can be selected from among a first setting for setting the full-screen mode, a second setting for setting the half-screen mode, and a third setting for maintaining a display mode (that is, the previous display mode) when a state transitions from the last normal operation state to the standby state or the stopped state. Hereinafter, settings of display modes at the time of starting will be described in detail.

(Display Mode Setting at Time of Starting)

FIG. 7 is a diagram illustrating an example of display mode setting at the time of starting according to the first embodiment. The first setting is a setting in which the full-screen mode is set and then transitions to a standby state or a stopped state such that a display mode at the time of next starting is the full-screen mode regardless of whether a previous display mode when a state is switched from a normal operation state to the standby state or the stopped state due to a logout or shutdown process is the full-screen mode or the half-screen mode. In the first setting, a display mode when starting from the standby state or the stopped state is always the full-screen mode. That is, in the first setting, when starting from the standby state or the stopped state, the control unit 18 is started in the full-screen mode before transition to the standby state or the stopped state.

The second setting is a setting in which the half-screen mode is set and then transitions to a standby state or a stopped state such that a display mode at the time of next starting is the half-screen mode regardless of whether a previous display mode when a state is switched from a normal operation state to the standby state or the stopped state due to a logout or shutdown process is the full-screen mode or the half-screen mode. In this second setting, a display mode when starting from the standby state or the stopped state is always the half-screen mode. That is, in the second setting, when starting from the standby state or the stopped state, the control unit 18 is started in the half-screen mode before transition to the standby state or the stopped state.

The third setting is a setting in which a state transitions to a standby state or a stopped state in a currently set display mode such that a previous display mode when a state is switched from a normal operation state to the standby state or the stopped state due to a logout or shutdown process is a display mode at the time of next starting. In other words, in a case where the previous display mode is the full-screen mode, a display mode at the time of next starting is set to the full-screen mode, and in a case where the previous display mode is the half-screen mode, a display mode at the time of next starting is set to the half-screen mode. In this third setting, a display mode when starting from the standby state or the stopped state is the previous display mode. That is, in the third setting, when starting from the standby state or the stopped state, the control unit 18 maintains a display mode before transition to the standby state or the stopped state and performs starting.

In a normal operation state after starting and log-in, a resolution can be changed. Therefore, in any of the first setting, the second setting, and the third setting, the control unit 18 controls a display mode to be the half-screen mode in a connected state in which the keyboard 30 is connected and control a display mode to be the full-screen mode in a non-connected state in which the keyboard 30 is not connected.

In the first embodiment, a user can freely select a display mode at the time of starting on the basis of the first setting, the second setting, and the third setting. A description will be made of an operation specification when the user selects a display mode at the time of starting with reference to FIG. 8.

Figure 8:
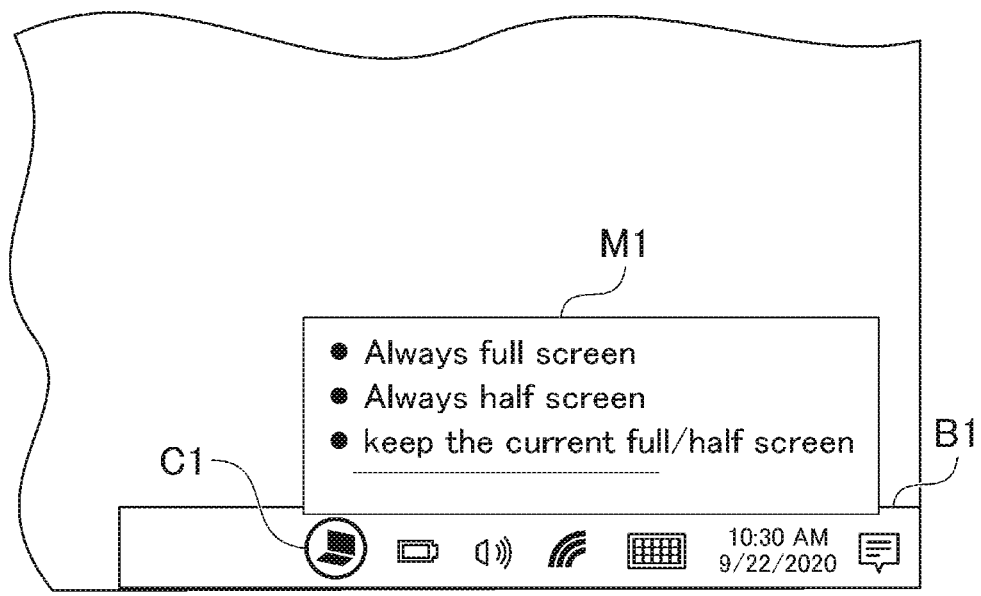
FIG. 8 is a diagram illustrating an example of a display mode setting selection screen at the time of starting according to the first embodiment.

FIG. 8 is a diagram illustrating an example of a selection screen for a display mode setting at the time of starting according to the first embodiment. In the example illustrated in FIG. 8, an icon C1 for displaying a selection screen for selecting a display mode setting at the time of starting is displayed in a task bar B1 displayed in the screen region of the display 150. By performing an operation such as long-pressing or right-clicking on the icon C1, a selection screen M1 is displayed in a pop-up form. For example, on the selection screen M1, the first setting (Always full screen), the second setting (Always half screen), and the third setting (Keep the current full/half screen) are displayed as setting options that can be selected by the user.

The user may select a display mode at the time of starting according to the user's preference by performing an operation of selecting any of the first setting (Always full screen), the second setting (Always half screen), and the third setting (Keep the current full/half screen) displayed on the selection screen M1.

When the user performs an operation of selecting any of the first setting, the second setting, and the third setting on the selection screen M1, the selection screen M1 is closed and hidden. Alternatively, even when the user performs an operation on a screen region outside the region of the selection screen M1, the selection screen M1 is closed and hidden.

(Functional Configuration of Control Unit 18)

Next, a functional configuration related to a display mode control process in which the control unit 18 controls a display mode will be described.

Figure 9:
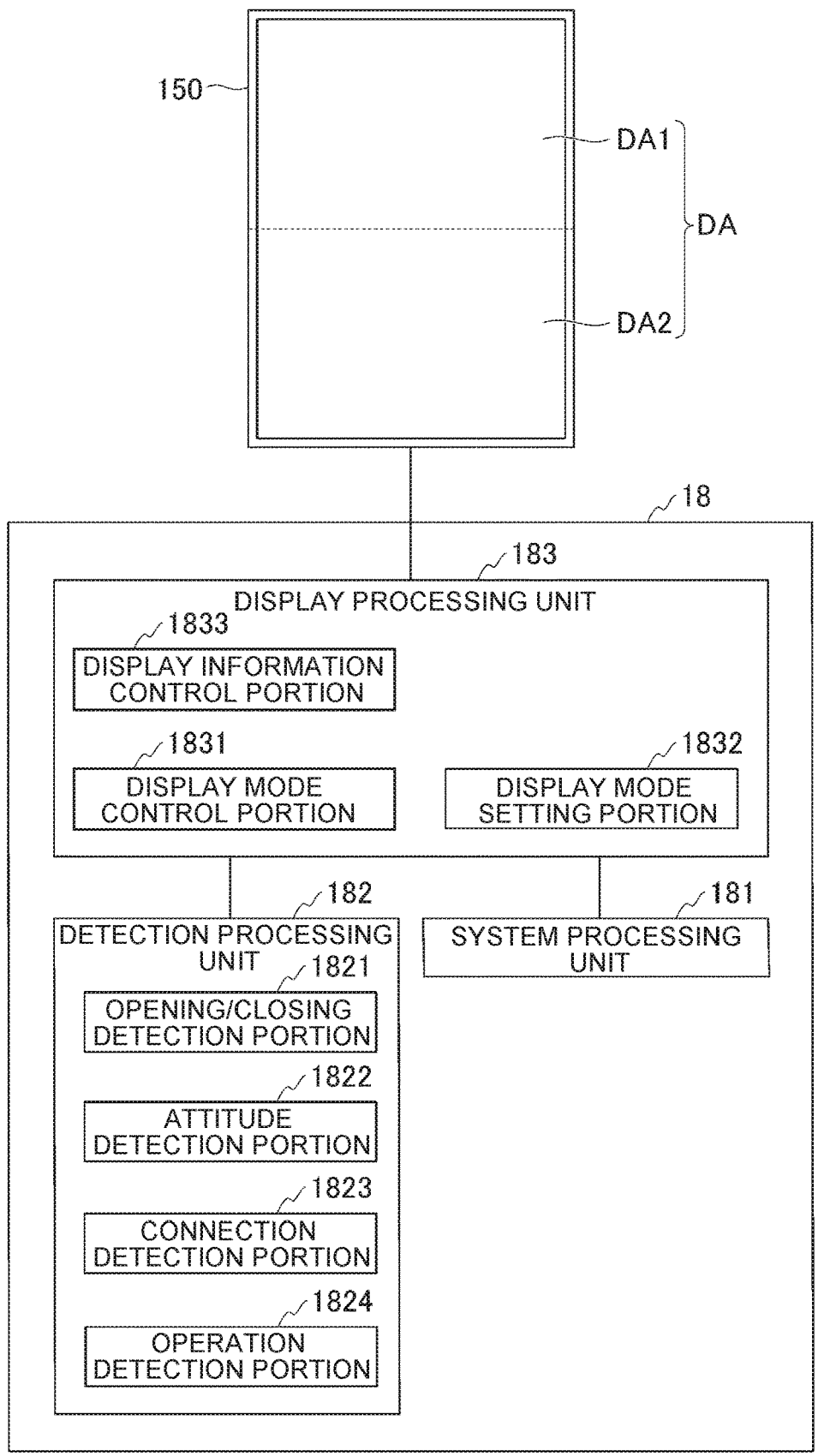
FIG. 9 is a block diagram illustrating an example of a functional configuration related to a display mode control process according to the first embodiment.

FIG. 9 is a block diagram illustrating an example of a functional configuration related to the display mode control process according to the first embodiment. The control unit 18 includes a system processing unit 181, a detection processing unit 182, and a display processing unit 183. Here, the system processing unit 181 is a functional configuration in which a CPU executes processing on the basis of, for example, an OS or a BIOS. The detection processing unit 182 has a functional configuration in which a microcomputer other than the CPU that executes processing of an OS, a BIOS, or the like executes various detection processes. The display processing unit 183 is a functional configuration in which the CPU executes processing on the basis of, for example, a program running on the OS.

The system processing unit 181 causes the system to transition to a normal operation state, a standby state, a stopped state, or the like by performing processing such as starting systems such as a BIOS and an OS, log in to the systems, log out, and shutting down the systems. The system processing unit 181 executes various programs such as a driver and an application running on the OS in the normal operation state.

The detection processing unit 182 includes an opening/closing detection portion 1821, an attitude detection portion 1822, and a connection detection portion 1823 as a functional configuration for detecting various states of the information processing apparatus 10. The opening/closing detection portion 1821 detects whether the information processing apparatus 10 is in an open state or a closed state on the basis of detection results from the first acceleration sensor 161 and the second acceleration sensor 162. In a case where the information processing apparatus 10 is in the open state, the opening/closing detection portion 1821 detects a folding angle of the display 150 on the basis of the detection results of the first acceleration sensor 161 and the second acceleration sensor 162. The folding angle of the display 150 corresponds to the opening angle θ between the first chassis 101 and the second chassis 102. On the basis of the detected opening angle θ, the opening/closing detection portion 1821 detects whether the information processing apparatus 10 is in a bent state (bent form) or a flat state (flat form). The attitude detection portion 1822 detects an attitude (orientation) of the information processing apparatus 10 on the basis of the detection results from the first acceleration sensor 161 and the second acceleration sensor 162. The connection detection portion 1823 detects a connection of the keyboard 30. For example, the connection detection portion 1823 detects whether or not the keyboard 30 is placed on the second screen region DA2 on the basis of a detection result from the hall sensor 17 and thus determines whether or not the keyboard 30 is connected (whether or not the keyboard 30 is placed). The detection processing unit 182 outputs the detection results (various states of the information processing apparatus 10) from the opening/closing detection portion 1821, the attitude detection portion 1822, and the connection detection portion 1823 to the display processing unit 183.

The display processing unit 183 performs a display process on the display 150. For example, the display processing unit 183 includes a display mode control portion 1831, a display mode setting portion 1832, and a display information control portion 1833.

The display mode control portion 1831 switches display modes on the basis of the open/closed state and the attitude (orientation) of the information processing apparatus 10, the presence or absence of connection with the keyboard 30 (that is, whether or not the keyboard 30 is placed), and the like acquired from the detection processing unit 182. For example, in the normal operation state, the display mode control portion 1831 controls a display mode to be the full-screen mode in a case of a non-connected state in which the keyboard 30 is not connected t (that is, a non-placed state), and controls a display mode to be the half-screen mode in a case of a connected state in which the keyboard 30 is connected (that is, a placed state).

The display mode control portion 1831 selects a display mode at the time of starting from among the always-fullscreen mode (first setting), the always-half-screen mode (second setting), and the keep-the-previous-display mode (third setting) on the basis of the display mode settings illustrated in FIG. 7, and controls the display mode to be selected mode For example, when a state transitions from the normal operation state to the standby state or the stopped state, the display mode control portion 1831 controls a display mode to be a display mode (the full-screen mode or the half-screen mode) according to the setting (the first setting, the second setting, or the third setting) selected by the display mode setting portion 1832 and then causes the state to transition to the standby state or the stopped state. The display mode control portion 1831 performs starting, at the time of next starting, in the display mode (the full-screen mode or the half-screen mode) controlled, that is, the previous display mode when transitioning from the normal operation state to the standby state or the stopped state.

The display mode setting portion 1832 sets a display mode at the time of starting on the basis of a user's operation. For example, the display mode setting portion 1832 selects any of the first setting, the second setting, and the third setting on the basis of the user's operation on the selection screen M1 illustrated in FIG. 8, and stores the selected setting as a setting of a display mode at the time of starting in the storage unit 13.

The display information control portion 1833 performs control for displaying display information on the display 150. For example, the display information control portion 1833 performs control for displaying the task bar B1, the icon C1, the selection screen M1, and the like illustrated in FIG. 8 on the display 150.

(Operation in Display Mode Control Process)

Next, an operation in the display mode control process in which the control unit 18 controls switching between the full-screen mode and the half-screen mode will be described.

First, an operation in the display mode control process of controlling switching between the full-screen mode and the half-screen mode in a normal operation state will be described with reference to FIG. 10.

Figure 10:
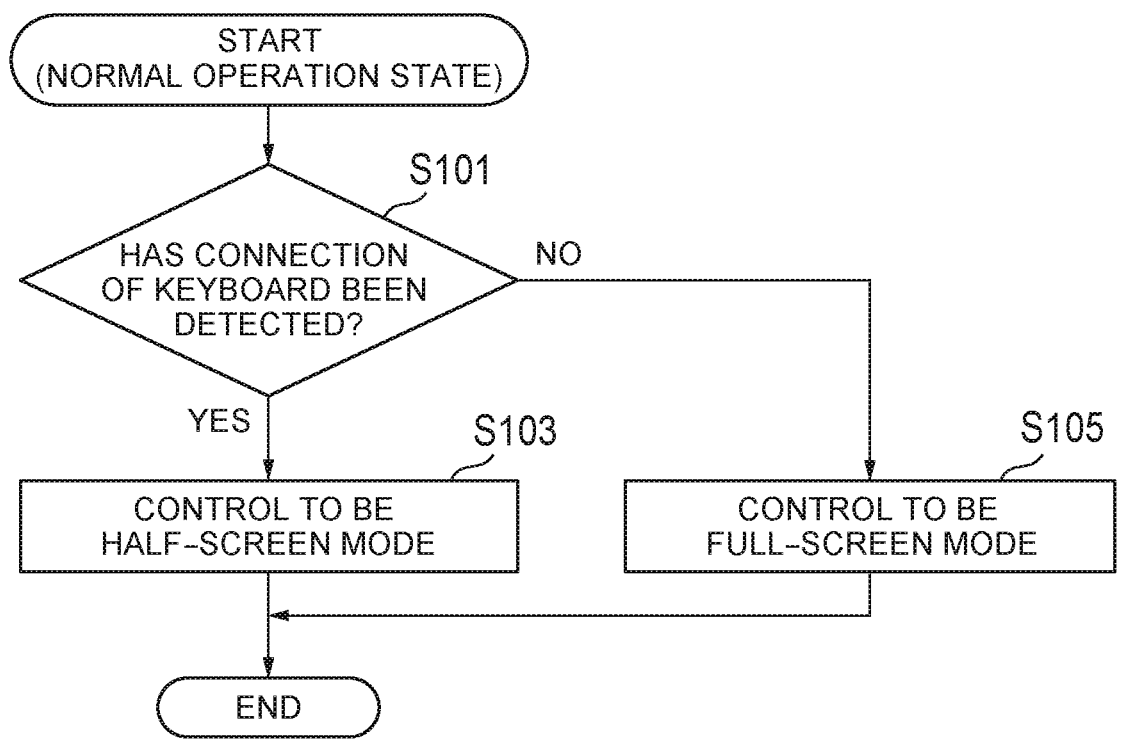
FIG. 10 is a flowchart illustrating an example of a display mode control process in a normal operation state according to the first embodiment.

FIG. 10 is a flowchart illustrating an example of the display mode control process in the normal operation state according to the first embodiment.

(Step S101) The control unit 18 determines whether or not a connection with the keyboard 30 has been detected on the basis of a detection result from the hall sensor 17 In a case where it is determined that the connection with the keyboard 30 has been detected (YES), the control unit 18 proceeds to the process in step S103. On the other hand, in a case where it is determined that the connection with the keyboard 30 has not been detected (NO), the control unit 18 proceeds to the process in step S105.

(Step S103) In a case where it is determined that the connection with the keyboard 30 has been detected, the control unit 18 controls a display mode to be the half-screen mode.

(Step S105) In a case where it is determined that the connection with the keyboard 30 has not been detected, the control unit 18 controls a display mode to be the full-screen mode.

Next, with reference to FIG. 11, an operation in a display mode control process of setting a display mode at the time of next starting during logout or shutdown will be described.

Figure 11:
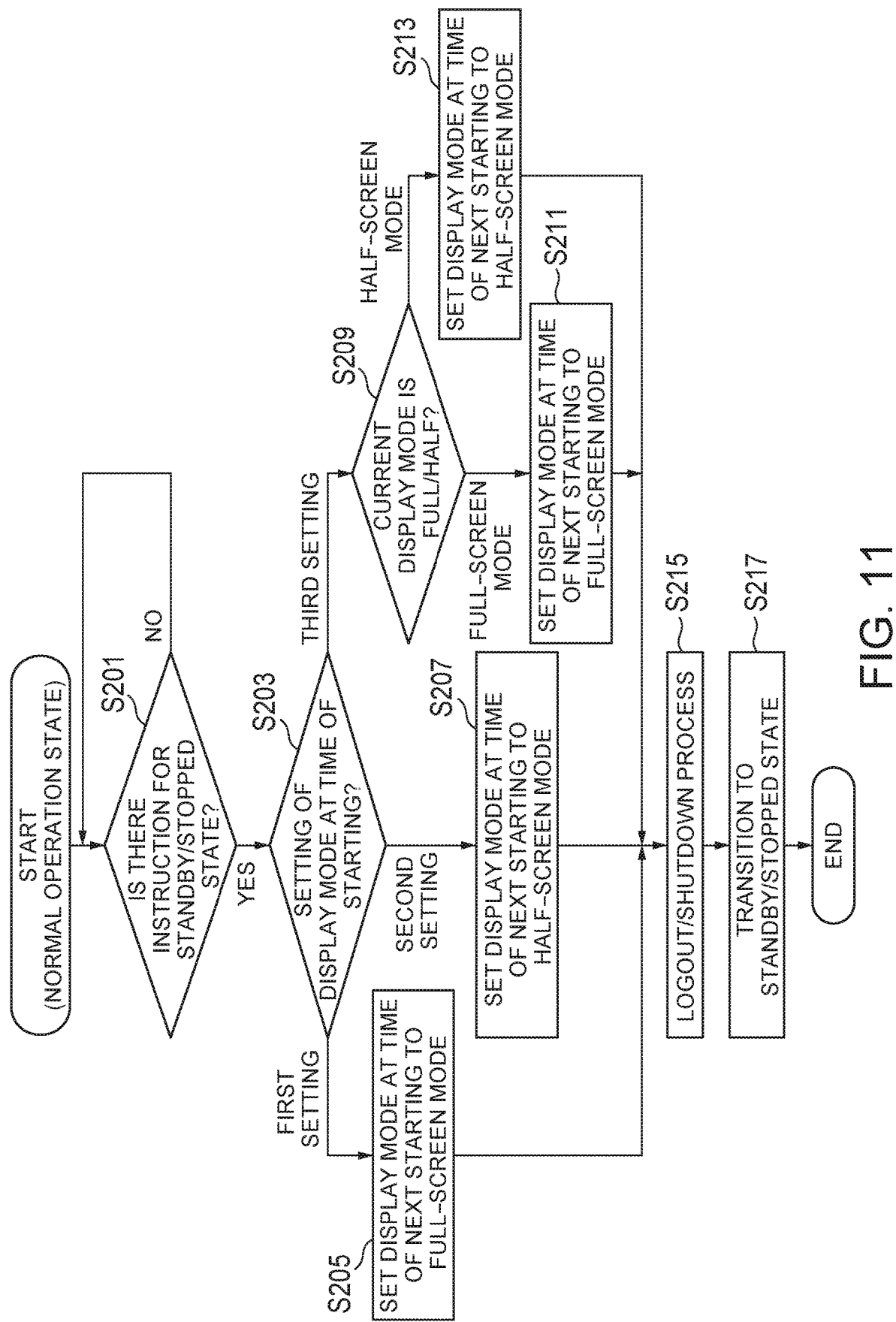
FIG. 11 is a flowchart illustrating an example of a display mode control process of setting a display mode at the time of starting according to the first embodiment.

FIG. 11 is a flowchart illustrating an example of a display mode control process of setting a display mode at the time of starting according to the first embodiment.

(Step S201) The control unit 18 determines whether or not an instruction for the standby state or the stopped state has been given in the normal operation state. In a case where it is determined that an instruction for the standby state or the stopped state has been given (YES), the control unit 18 proceeds to the process in step S203. On the other hand, in a case where it is determined that an instruction for the standby state or the stopped state has not been given (NO), the control unit 18 performs the process in step S201 again.

(Step S203) The control unit 18 determines whether the display mode setting at the time of starting (refer to FIG. 7) selected by the user is one of the first setting, the second setting, and the third setting. In a case where the display mode setting at the time of starting is the first setting, the control unit 18 proceeds to the process in step S205. In a case where the display mode setting at the time of starting is the second setting, the control unit 18 proceeds to the process in step S207. In a case where the display mode setting at the time of starting is the third setting, the control unit 18 proceeds to the process in step S209.

(Step S205) In the case of the first setting, the control unit 18 sets a display mode at the time of next starting to the full-screen mode. For example, the control unit 18 controls a display mode to be the full-screen mode such that a display mode at the time of next starting is the full-screen mode regardless of whether the current display mode is the full-screen mode or the half-screen mode. That is, the control unit 18 controls a display mode to be a resolution corresponding to the full-screen mode. The flow proceeds to the process in step S215.

(Step S207) In the case of the second setting, the control unit 18 sets a display mode at the time of next starting to the half-screen mode. For example, the control unit 18 controls a display mode to be the half-screen mode such that a display mode at the time of next starting is the half-screen mode regardless of whether the current display mode is the full-screen mode or the half-screen mode. That is, the control unit 18 controls a display mode to be a resolution corresponding to the half-screen mode. The flow proceeds to the process in step S215.

(Step S209) In the case of the third setting, the control unit 18 determines whether the current display mode is the full-screen mode or the half-screen mode. In a case where it is determined that the display mode is the full-screen mode, the control unit 18 proceeds to the process in step S211. On the other hand, in a case where it is determined that the display mode is the half-screen mode, the control unit 18 proceeds to the process in step S213.

(Step S211) The control unit 18 sets a display mode at the time of next starting to the full-screen mode. For example, the control unit 18 maintains the full-screen mode such that a display mode at the time of next starting is also the full-screen mode. That is, the control unit 18 maintains a resolution in the full-screen mode. The flow proceeds to the process in step S215.

(Step S213) The control unit 18 sets a display mode at the time of next starting to the half-screen mode. For example, the control unit 18 maintains the half-screen mode such that a display mode at the time of next starting is also the half-screen mode. That is, the control unit 18 maintains a resolution in the half-screen mode. The flow proceeds to the process in step S215.

(Step S215) The control unit 18 executes a system logout process or a system shutdown process, and proceeds to the process in step S217.

(Step S217) The control unit 18 causes the system to transition to a standby state or a stopped state.

Next, an operation in a display mode control process at the time of starting will be described with reference to FIG. 12.

Figure 12:
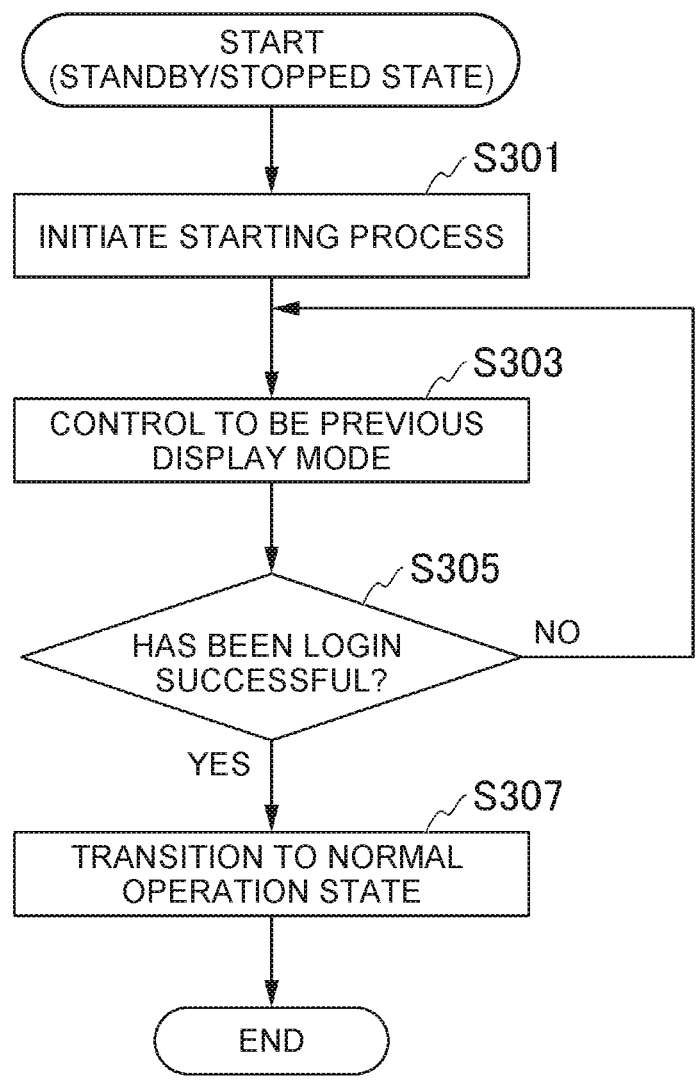
FIG. 12 is a flowchart illustrating an example of a display mode control process at the time of starting according to the first embodiment.

FIG. 12 is a flowchart illustrating an example of a display mode control process at the time of starting according to the first embodiment.

(Step S301) The control unit 18 initiates a system starting process from the standby state or the stopped state according to a starting trigger. The starting trigger is a transition from a closed state to an open state, an operation of turning on the power, or the like. The flow proceeds to the process in step S303.

(Step S303) The control unit 18 controls a display mode to be the display mode (previous display mode) that is controlled to be the display mode at the time of next starting when switching from the normal operation state to the standby state or the stopped state in the process illustrated in FIG. 11. For example, in a case where a display mode at the time of next starting when switching from the normal operation state to the standby state or the stopped state is controlled to be the full-screen mode, the control unit 18 performs a starting process in the full-screen mode. On the other hand, in a case where a display mode at the time of next starting when switching from the normal operation state to the standby state or the stopped state is controlled to be the half-screen mode, the control unit 18 performs a starting process in the half-screen mode. The flow proceeds to the process in step S305.

(Step S305) The control unit 18 executes a system log-in process and determines whether or not the log-in has been successful. In a case where it is determined that the log-in has not been successful (NO), the control unit 18 returns to step S303, and continues the starting process in the display mode at the time of starting. On the other hand, in a case where it is determined that the log-in has been successful (YES), the control unit 18 proceeds to the process in step S307.

(Step S307) The control unit 18 causes a state to transition to the normal operation state. In the normal operation state after log-in, the control unit 18 performs the display mode control process illustrated in FIG. 10.

As described above, the information processing apparatus 10 according to the first embodiment includes one foldable display 150, the RAM 12 (an example of a memory) that temporarily stores system programs, and the control unit 18 (for example, an example of a processor such as a CPU, a GPU, or a microcomputer) that performs control based on the system by executing the system programs stored in the RAM 12. The control unit 18 performs an operation state control process of switching an operation state of the system between a normal operation state (an example of a first operation state) and a standby state (an example of a second operation state) or a stopped state (an example of a second operation state) in which some or all of the processes executed by the system are restricted more than in the normal operation state. The control unit 18 performs a connection determination process (placement determination process) of determining whether or not the external keyboard 30 placed on the second screen region DA2 (an example of a predetermined screen region) in the screen region DA of the display 150 is connected (that is, whether or not the keyboard 30 is placed). The information processing apparatus 10 has the full-screen mode (an example of a first display mode) in which the entire screen region DA of the display 150 is controlled to be displayed as a display region, and the half-screen mode (an example of a second display mode) in which a partial screen region (for example, the first screen region DA1) excluding the second screen region DA2 in the screen region of the display 150 is controlled to be displayed as a display region. In the normal operation state, the control unit 18 performs a first control process of performing control for setting the full-screen mode in a case of a non-connected state (non-placed state) in which the keyboard 30 is not connected, and control for setting the half-screen mode in a case of a connected state (placed state) in which the keyboard 30 is connected. The control unit 18 performs a second control process of, when a state is switched from the normal operation state to the standby state or the stopped state, selecting a display mode when the next state is switched from the standby state or the stopped state to the normal operation state (at the time of starting) from among the full-screen mode, the half-screen mode, and a previous display mode out of the full-screen mode and the half-screen mode.

As a result, when a state is switched from the normal operation state to the standby state or the stopped state, the information processing apparatus 10 can select a display mode at the time of next starting to be the full-screen mode or the half-screen mode, or a previous display mode out of the two display modes, and can thus appropriately control display on the display when the external keyboard 30 is used.

For example, the control unit 18 further performs a display information control process of displaying, on the display 150, the selection screen M1 (an example of a selection screen) for allowing a user to select a display mode selected in the second control process on the basis of any of the first setting for setting the full-screen mode, the second setting for setting the half-screen mode, and the third setting for setting a previous display mode out of the full-screen mode and the half-screen mode. In the second control process, the control unit 18 selects a display mode when the next state is switched from the standby state or the stopped state to the normal operation state (at the time of starting) on the basis of a setting selected through the user's operation on the selection screen M1 from among the first setting, the second setting, and the third setting.

Consequently, the information processing apparatus 10 selects whether a display mode at the time of starting is the full-screen mode, the half-screen mode, or a previous display mode out of the two display modes, according to the intention of the user, and can thus appropriately control display on the display when the external keyboard 30 is used.

In the second control process, when a state is switched from the normal operation state to the standby state or the stopped state, the control unit 18 controls a display mode when the next state is switched from the standby state or the stopped state to the normal operation state (at the time of starting) to be either the full-screen mode and the half-screen mode. When a state is switched from the standby state or the stopped state to the normal operation state (at the time starting), the control unit 18 controls display on the display 150 in a display mode (previous display mode) controlled when previously switching from the normal operation state to the standby state or the stopped state.

As a result, the information processing apparatus 10 is controlled to be in a desired display mode when the information processing apparatus 10 is started next time when switching from the normal operation state to the standby state or the stopped state, and can thus be started in the desired display mode although a resolution cannot be changed before log-in at the time of starting.

A control method in the information processing apparatus 10 according to the first embodiment includes causing the control unit 18 (for example, an example of a processor such as a CPU, a GPU, or a microcomputer) to execute a step of switching an operation state of the system between a normal operation state (an example of a first operation state) and a standby state (an example of a second operation state) or a stopped state (an example of a second operation state) in which part or the whole of the processing executed by the system is restricted more than in the normal operation state, a step of determining whether or not the external keyboard 30 to be placed on the second screen region DA2 (an example of a predetermined screen region) in the screen region DA of the display 150 is connected (that is, whether or not the keyboard 30 is placed), a step of, in the normal operation state, performing control for setting the full-screen mode in a case of a non-connected state (non-placed state) in which the keyboard 30 is not connected, and control for setting the half-screen mode in a case of a connected state (placed state) in which the keyboard 30 is connected, and a step of, when a state is switched from the normal operation state to the standby state or the stopped state, selecting a display mode when the next state is switched from the standby state or the stopped state to the normal operation state (at the time of starting) from among the full-screen mode, the half-screen mode, and a previous display mode out of the full-screen mode and the half-screen mode.

As a result, when a state is switched from the normal operation state to the standby state or the stopped state, the information processing apparatus 10 can select a display mode at the time of next starting to be the full-screen mode or the half-screen mode, or a previous display mode out of the two display modes, and can thus appropriately control display on the display when the external keyboard 30 is used.

Second Embodiment

Next, a second embodiment will be described.

In the first embodiment, an aspect in which a user selects a display mode setting at the time of starting illustrated in FIG. 7 to control whether starting is performed in the full-screen mode or the half-screen mode has been described. In the second embodiment, a description will be made of an aspect in which, depending on a greater value of a connected state (that is, a placed state) in which the keyboard 30 is connected and a non-connected state (that is, a non-placed state) in which the keyboard 30 is not connected at the time of starting, whether starting is performed in the full-screen mode or the half-screen mode is automatically determined.

Since a fundamental configuration of the information processing apparatus 10 according to the second embodiment is the same as the configuration described with reference to FIGS. 1 to 3, 5, and 9 in the first embodiment, the description thereof will be omitted. Here, characteristic processing of the second embodiment will be described.

For example, the connection detection portion 1823 determines whether the keyboard 30 is in a connected state or a non-connected state each time starting is performed, and accumulates determination results and stores the determination results in the storage unit 13. The display mode control portion 1831 selects a display mode corresponding to a greater cumulative value as a display mode at the time of starting on the basis of the determination results from the connection detection portion 1823. In other words, the display mode control portion 1831 selects the half-screen mode in a case where a cumulative value of the connected state of the keyboard 30 is greater than a cumulative value of the non-connected state as a display mode at the time of starting, and selects the full-screen mode in a case where the cumulative value of the non-connected state of the keyboard 30 is greater than the cumulative value of the connected state. The display mode control portion 1831 controls a display mode to be a display mode selected on the basis of a cumulative value of the connected state and a cumulative value of the non-connected state when switching from the normal operation state to the standby state or the stopped state, and controls a display mode to be selected display mode at the time of next starting.

Figure 13:
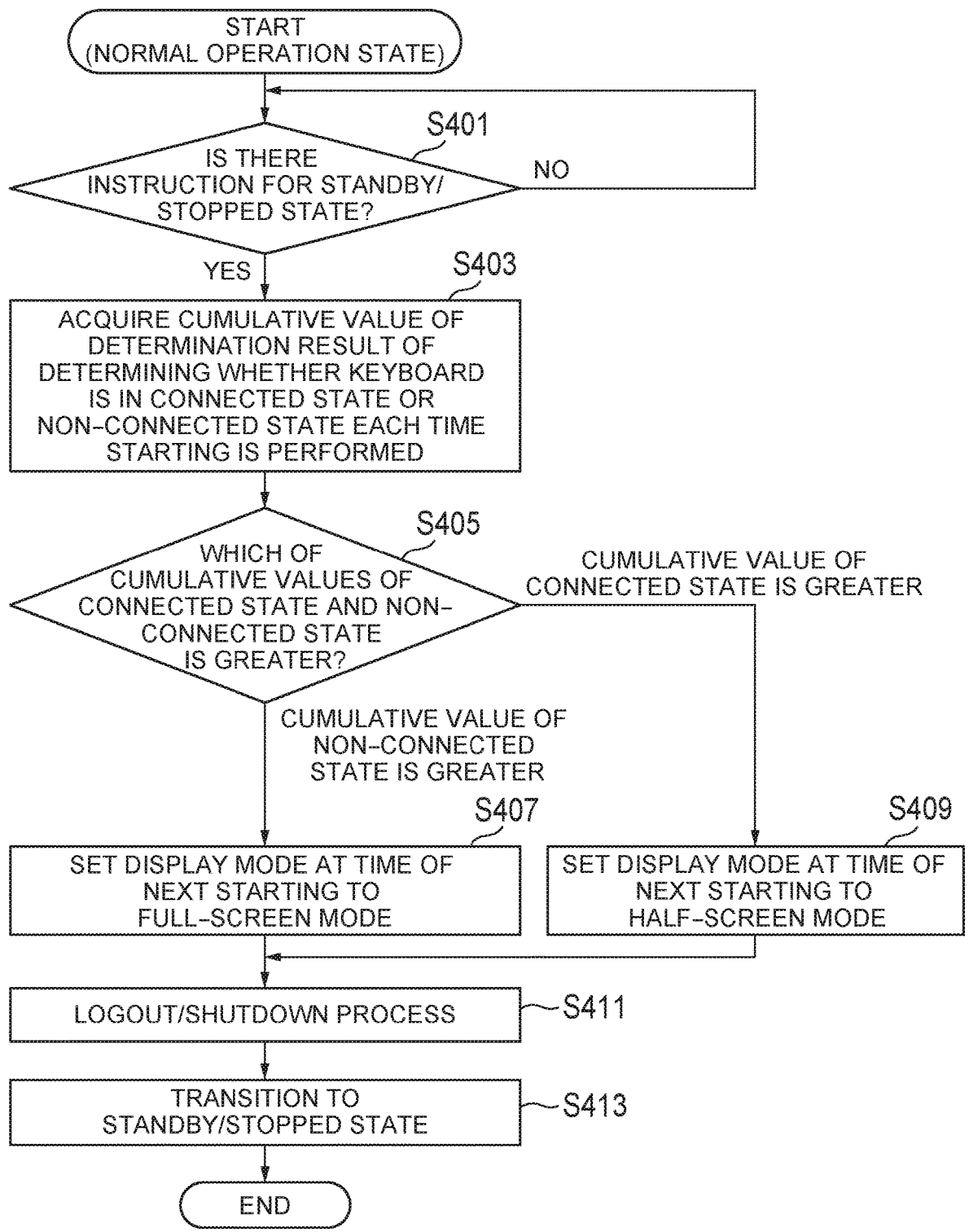
FIG. 13 is a flowchart illustrating an example of a display mode control process of setting a display mode at the time of starting according to a second embodiment.

FIG. 13 is a flowchart illustrating an example of a display mode control process of setting a display mode at the time of starting according to the second embodiment.

(Step S401) The control unit 18 determines whether or not an instruction for the standby state or the stopped state has been given in the normal operation state. In a case where it is determined that an instruction for the standby state or the stopped state has been given (YES), the control unit 18 proceeds to the process in step S403. On the other hand, in a case where it is determined that an instruction for the standby state or the stopped state has not been given (NO), the control unit 18 performs the process in step S401 again.

(Step S403) Each time starting is performed, the control unit 18 reads out and acquires a cumulative value of determination results of determining a connected state or a non-connected state of the keyboard 30 from the storage unit 13. The flow proceeds to the process in step S405.

(Step S405) The control unit 18 determines which of the cumulative value of the connected state and the cumulative value of the non-connected state is greater. In a case where it is determined that the cumulative value of the non-connected state is greater than the cumulative value of the connected state, the control unit 18 proceeds to the process in step S407. On the other hand, in a case where it is determined that the cumulative value of the connected state is greater than the cumulative value of the non-connected state, the control unit 18 proceeds to the process in step S409.

(Step S407) The control unit 18 sets a display mode at the time of next starting to the full-screen mode. For example, the control unit 18 controls a display mode to be the full-screen mode such that a display mode at the time of next starting is the full-screen mode regardless of whether the current display mode is the full-screen mode or the half-screen mode. That is, the control unit 18 controls a display mode to be a resolution corresponding to the full-screen mode. The flow proceeds to the process in step S411.

(Step S409) The control unit 18 sets a display mode at the time of next starting to the half-screen mode. For example, the control unit 18 controls a display mode to be the half-screen mode such that a display mode at the time of next starting is the half-screen mode regardless of whether the current display mode is the full-screen mode or the half-screen mode. That is, the control unit 18 controls a display mode to be a resolution corresponding to the half-screen mode. The flow proceeds to the process in step S411.

(Step S411) The control unit 18 executes a system logout process or a system shutdown process, and proceeds to the process in step S413.

(Step S413) The control unit 18 causes the system to transition to the standby state or the stopped state.

The subsequent display mode control process at the time of next starting is the same as the process illustrated in FIG. 12. In a case where a display mode is controlled to be the full-screen mode in step S407 and then transition to the standby state or the stopped state occurs, the control unit 18 performs starting in the full-screen mode at the time of next starting. In a case where a display mode is controlled to be the half-screen mode in step S409 and then transition to the standby state or the stopped state occurs, the control unit 18 performs starting in the half-screen mode at the time of next starting.

As described above, in the information processing apparatus 10 according to the second embodiment, the control unit 18 further performs a connection state accumulation process (placement state accumulation process) of determining whether or not the keyboard 30 is in a connected state (that is, a placed state) or a non-connected state (that is, a non-placed state) and accumulates determination results to be stored each time a state is switched from the standby state or the stopped state to the normal operation state (each time starting is performed). When a state is switched from the normal operation state to the standby state or the stopped state, as a display mode when the next state is switched from the standby state or the stopped state to the normal operation state (at the time of starting), the control unit 18 selects the half-screen mode in a case where a cumulative value of the connected state (that is, a placed state) is greater than a cumulative value of the non-connected state (that is, a non-placed state), and selects the full-screen mode in a case where the cumulative value of the non-connected state (that is, a non-placed state) is greater than the cumulative value of the connected state (that is, a placed state).

As a result, the information processing apparatus 10 can automatically determine whether to perform starting in the full-screen mode or the half-screen mode at the time of starting depending on a greater value of the connected state (that is, placed state) in which the keyboard 30 is connected and the non-connected state (that is, a non-placed state) in which the keyboard 30 is not connected, and can thus appropriately control display on the display when the external keyboard 30 is used.

In a case where a difference between a cumulative value of the connected state (that is, a placed state) and a cumulative value of the non-connected state (that is, a non-placed state) is equal to or more than a predetermined threshold value, the control unit 18 may control whether to perform starting in the full-screen mode or the half-screen mode depending on a greater value of the connected state (that is, a placed state) and the non-connected state (that is, a non-placed state). On the other hand, in a case where the difference between the cumulative value of the connected state (that is, a placed state) and the cumulative value of the non-connected state (that is, a non-placed state) is less than a predetermined threshold value (that is, in a case where there is little difference between the two cumulative values), the control unit 18 may control to maintain a display mode before transition to the standby state or the stopped state and perform starting in the same manner as when the third setting is selected.

Third Embodiment

Next, a third embodiment will be described.

In the third embodiment, a description will be made of an aspect in which, when a logout or shutdown process is performed and a state is switched to a standby state or a stopped state, a user's tendency (preference) is estimated from behaviors such as usage forms of the information processing apparatus 10 so far, and it is automatically determined whether starting is performed in a full-screen mode or a half-screen mode at the time of next starting according to the user's tendency.

Since a fundamental configuration of the information processing apparatus 10 according to the third embodiment is the same as the configuration described with reference to FIGS. 1 to 3, and 5 in the first embodiment, the description thereof will be omitted. A functional configuration of the information processing apparatus 10 according to the third embodiment is partially different from the configuration illustrated in FIG. 9.

Figure 14:
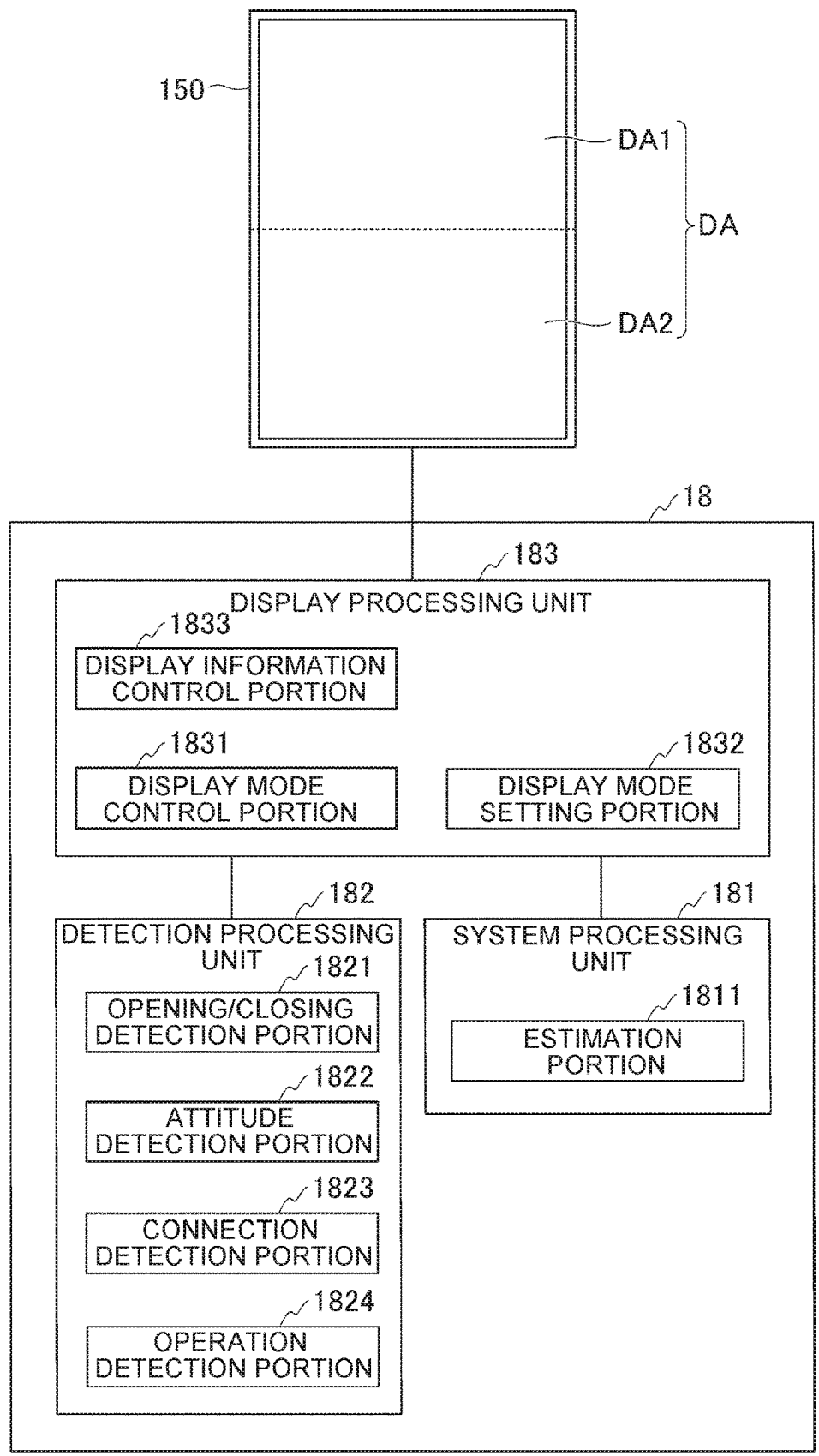
FIG. 14 is a block diagram illustrating an example of a functional configuration of an information processing apparatus according to a third embodiment.

FIG. 14 is a block diagram illustrating an example of a functional configuration of the information processing apparatus 10 according to the third embodiment. In the illustrated example, the configuration is different from the configuration illustrated in FIG. 9 in that the system processing unit 181 includes an estimation portion 1811.

For example, the connection detection portion 1823 determines whether the keyboard 30 is in a connected state or a non-connected state, and stores a history of the determination results in the storage unit 13. The opening/closing detection portion 1821 detects whether the information processing apparatus 10 is in a bent state (bent form) or a flat state (flat form) on the basis of detection results from the first acceleration sensor 161 and the second acceleration sensor 162, and stores a history of the detection results in the storage unit 13. The attitude detection portion 1822 detects an attitude (orientation) of the information processing apparatus 10 on the basis of detection results from the first acceleration sensor 161 and the second acceleration sensor 162, and stores a history of the detection results in the storage unit 13. The display mode control portion 1831 stores a display mode control history in the storage unit 13.

The estimation portion 1811 refers to the respective histories stored in the storage unit 13, and estimates a tendency when the user uses the information processing apparatus 10 on the basis of various behaviors (usage forms) such as whether the keyboard 30 is in a connected state or a non-connected state, switching between display modes, and attitudes (orientations) of the information processing apparatus 10, and a bent state (bent form) or a flat state (flat form). For example, the estimation portion 1811 estimates which display mode is most preferable for the user at the time of starting, on the basis of the tendency of the usage form before transition to the standby state or the stopped state.

When a state is switched to the standby state or the stopped state, the display mode control portion 1831 selects a display mode at the time of starting on the basis of the user's tendency (preference) estimated on the basis of various behaviors of the information processing apparatus 10 so far. For example, the display mode control portion 1831 selects the full-screen mode for a user who tends to remove the keyboard 30 immediately after starting even in a state in which the keyboard 30 is frequently placed at the time of starting, on the basis of the user's tendency estimated by the estimation portion 1811.

Figure 15:
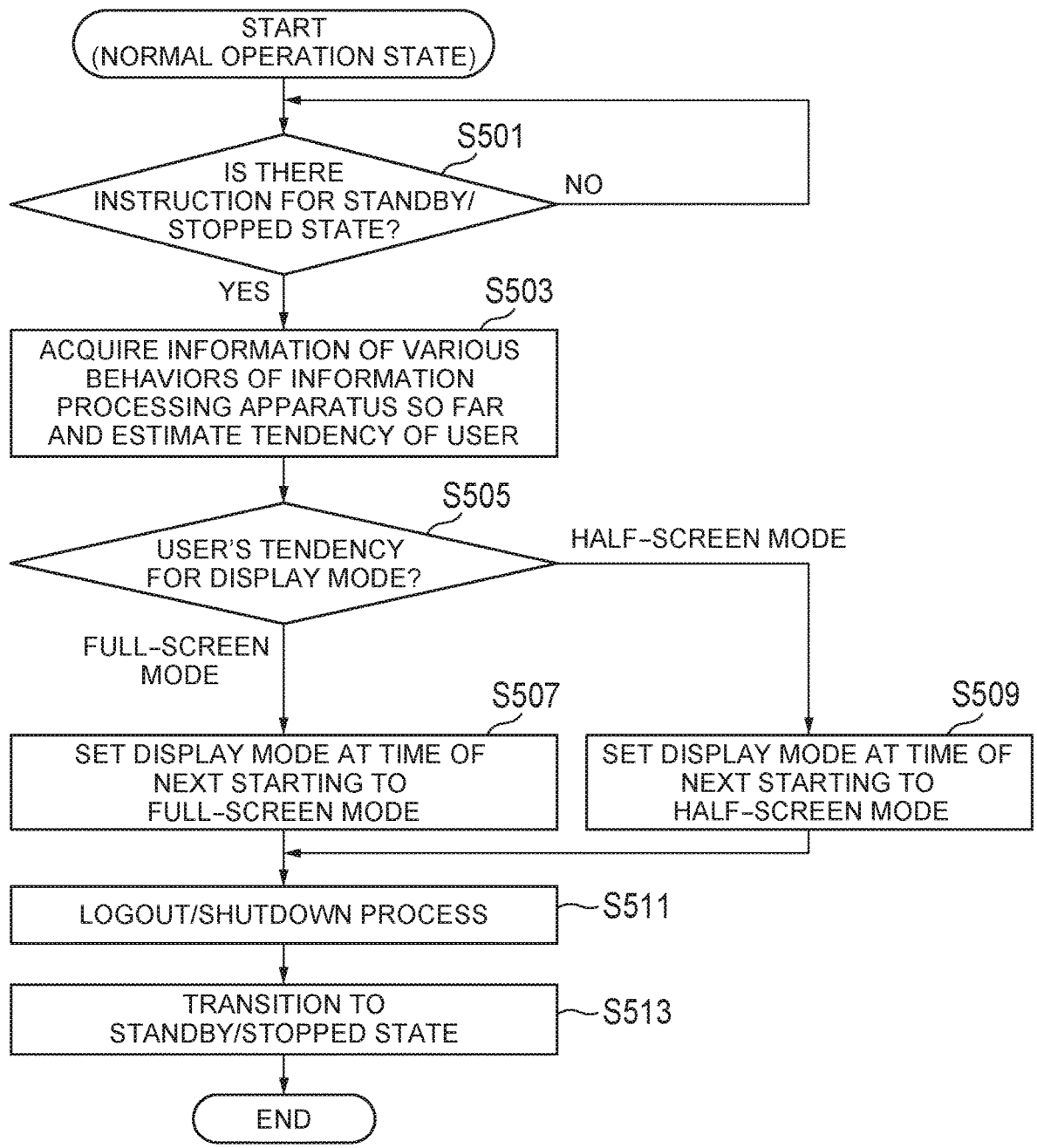
FIG. 15 is a flowchart illustrating an example of a display mode control process of setting a display mode at the time of starting according to the third embodiment.

FIG. 15 is a flowchart illustrating an example of a display mode control process of setting a display mode at the time of starting according to the third embodiment. Each process in steps S501 and S507 to S513 illustrated in FIG. 15 is the same as that in steps S401 and S407 to S413 illustrated in FIG. 12. On the other hand, the processes in step S503 and S505 illustrated in FIG. 15 are different from the processes in S403 and S405 illustrated in FIG. 12.

(Step S501) The control unit 18 determines whether or not an instruction to the standby state or the stopped state has been given in the normal operation state. In a case where it is determined that an instruction for the standby state or the stopped state has been given (YES), the control unit 18 proceeds to the process in step S503. On the other hand, in a case where it is determined that an instruction for the standby state or the stopped state has not been given (NO), the control unit 18 performs the process in step S501 again.

(Step S503) The control unit 18 acquires various behaviors of the information processing apparatus 10 so far such as whether the keyboard 30 is in a connected state or a non-connected state, switching between display modes, and attitudes (orientations) of the information processing apparatus 10, and a bent state (bent form) or a flat state (flat form), and estimates the user's tendency (preference) on the basis of the acquired various behaviors. The flow proceeds to the process in step S505.

The control unit 18 may acquire at least some of behaviors such as whether the keyboard 30 is in a connected state or a non-connected state, switching between display modes, and attitudes (orientations) of the information processing apparatus 10, and a bent state (bent form) or a flat state (flat form), and estimate the user's tendency (preference) on the basis of the acquired behaviors.

(Step S505) The control unit 18 determines whether the user's tendency (preference) for a display mode is the full-screen mode or the half-screen mode on the basis of the estimation result in step S503. In a case where it is determined that the user's tendency (preference) is the full-screen mode, the control unit 18 proceeds to the process in step S507. On the other hand, in a case where it is determined that the user's tendency (preference) is the half-screen mode, the control unit 18 proceeds to the process in step S509.

(Step S507) The control unit 18 sets a display mode at the time of next starting to the full-screen mode. For example, the control unit 18 controls a display mode to be the full-screen mode such that a display mode at the time of next starting is the full-screen mode regardless of whether the current display mode is the full-screen mode or the half-screen mode. That is, the control unit 18 controls a display mode to be a resolution corresponding to the full-screen mode. The flow proceeds to the process in step S511.

(Step S509) The control unit 18 sets a display mode at the time of next starting to the half-screen mode. For example, the control unit 18 controls a display mode to be the half-screen mode such that a display mode at the time of next starting is the half-screen mode regardless of whether the current display mode is the full-screen mode or the half-screen mode. That is, the control unit 18 controls a display mode to be a resolution corresponding to the half-screen mode. The flow proceeds to the process in step S511.

(Step S511) The control unit 18 executes a system logout process or a system shutdown process, and proceeds to the process in step S513.

(Step S513) The control unit 18 causes the system to transition to the standby state or the stopped state.

The subsequent display mode control process at the time of next starting is the same as the process illustrated in FIG. 12. In a case where a display mode is controlled to be the full-screen mode in step S507 and then a state transitions to the standby state or the stopped state, the control unit 18 performs starting in the full-screen mode at the time of next starting. In a case where a display mode is controlled to be the half-screen mode in step S509 and then a state transitions to the standby state or the stopped state, the control unit 18 performs starting in the half-screen mode at the time of next starting.

As described above, the information processing apparatus 10 according to the third embodiment includes the first acceleration sensor 161 and the second acceleration sensor 162 (an example of first sensors) for detecting an attitude (orientation) of the information processing apparatus 10. The information processing apparatus 10 includes the first acceleration sensor 161 and the second acceleration sensor 162 (an example of second sensors) for detecting a folding angle (opening angle θ) of the display 150. The first sensor for detecting an attitude (orientation) of the information processing apparatus 10 and the second sensor for detecting a folding angle (opening angle θ) of the display 150 may be different sensors.

The control unit 18 performs an estimation process of estimating a tendency when the user uses the information processing apparatus 10 on the basis of, when a state is switched from the normal operation state to the standby state or the stopped state, at least any of the presence or absence of connection of the keyboard 30 before the switching (that is, whether or not the keyboard 30 is placed), and switching between display modes (that is, switching between the full-screen mode and the half-screen mode), an orientation of the information processing apparatus 10, and a folding angle (opening angle θ) of the display 150. When a state is switched from the normal operation state to the standby state or the stopped state, the control unit 18 selects a display mode when the next state is switched from the standby state or the stopped state to the normal operation state (at the time of starting) on the basis of the tendency estimated in the estimation process.

As a result, the information processing apparatus 10 can automatically determine whether to perform starting in the full-screen mode or the half-screen mode according to the user's tendency (preference), and can thus appropriately control display on the display when the external keyboard 30 is used.

Fourth Embodiment

Next, a fourth embodiment will be described.

In the fourth embodiment, a description will be made of an aspect in which, when a logout or shutdown process is performed and a state is switched to a standby state or a stopped state, it is automatically determined whether starting is performed in a full-screen mode or a half-screen mode at the time of next starting according to a time period.

Since a fundamental configuration of the information processing apparatus 10 according to the fourth embodiment is the same as the configuration described with reference to FIGS. 1 to 3, and 5 in the first embodiment, the description thereof will be omitted. A functional configuration of the information processing apparatus 10 according to the fourth embodiment is partially different from the configuration illustrated in FIG. 9.

Figure 16:
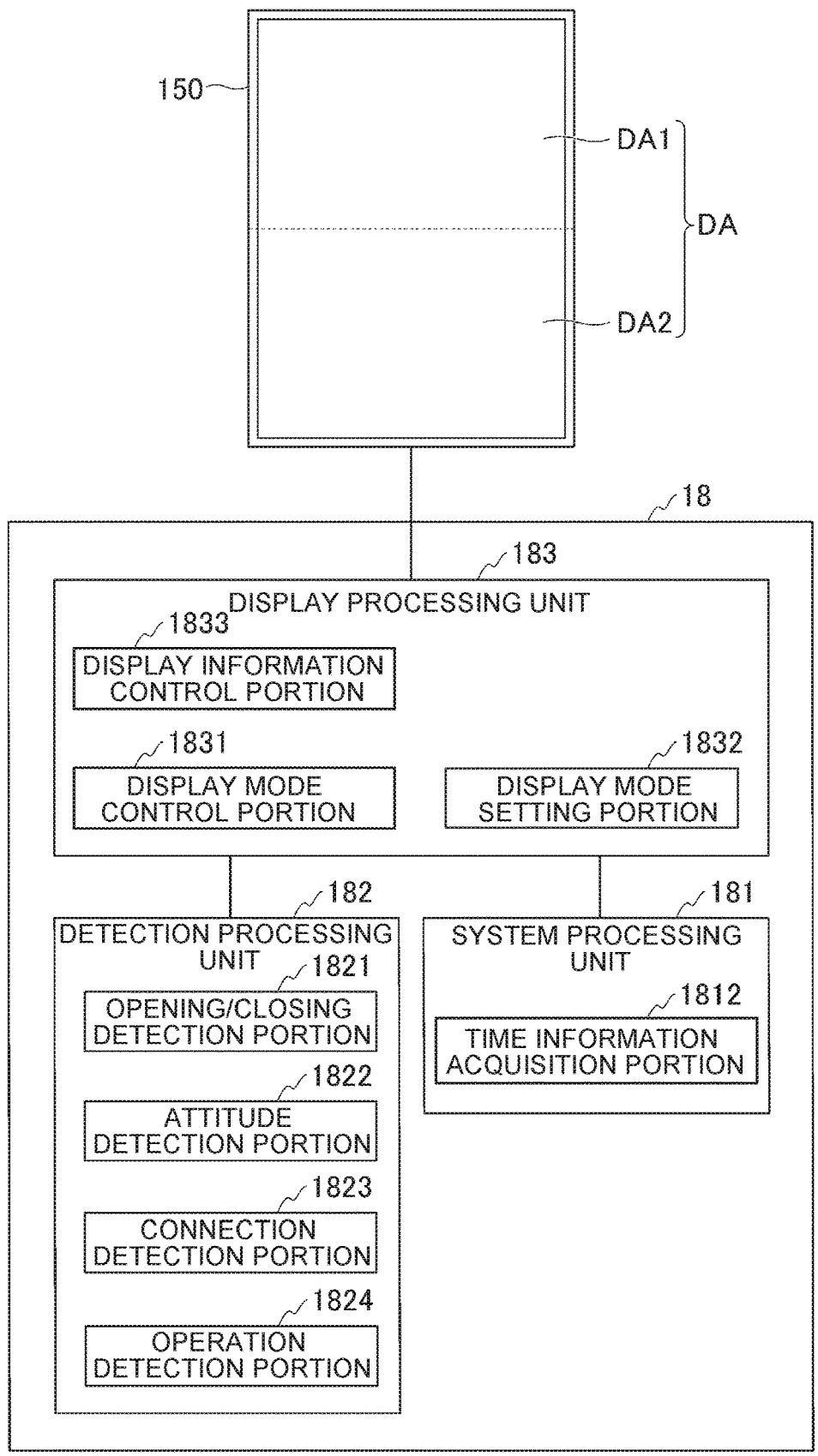
FIG. 16 is a block diagram illustrating an example of a functional configuration of an information processing apparatus according to a fourth embodiment.

FIG. 16 is a block diagram illustrating an example of a functional configuration of the information processing apparatus 10 according to the fourth embodiment. In the illustrated example, the configuration is different from the configuration illustrated in FIG. 9 in that the system processing unit 181 includes a time information acquisition portion 1812.

The time information acquisition portion 1812 has a clock function such as a real time clock (RTC) and acquires the current time information. The time information acquired by the time information acquisition portion 1812 may be adjusted to the correct current time by a time server connected via the communication unit 11 at any time.

When a state is switched to the standby state or the stopped state, the display mode control portion 1831 selects a display mode at the time of next starting on the basis of the current time information and a display mode set in advance for each time period.

For example, in a case where the time at which a state is switched to the standby state or the stopped state is a time period (evening time period) from 17:00 to 19:00, a display mode at the time of next starting may be set to the full-screen mode. In this case, starting may be performed in the full-screen mode on the assumption that next starting is a purpose of use (for example, hobbies or play) after work is finished. In a case where the time at which a state is switched to the standby state or the stopped state is a time period (intermediate night time period) after 21 o'clock (for example, 21:00 to 03:00 the next day), a display mode at the time of next starting may be set to the half-screen mode. In this case, assuming that next starting is a purpose of work in the morning, starting may be performed in the half-screen mode in which the keyboard 30 is used.

A time period and a display mode may be set freely. A user may be allowed to set a time period and a display mode.

Figure 17:
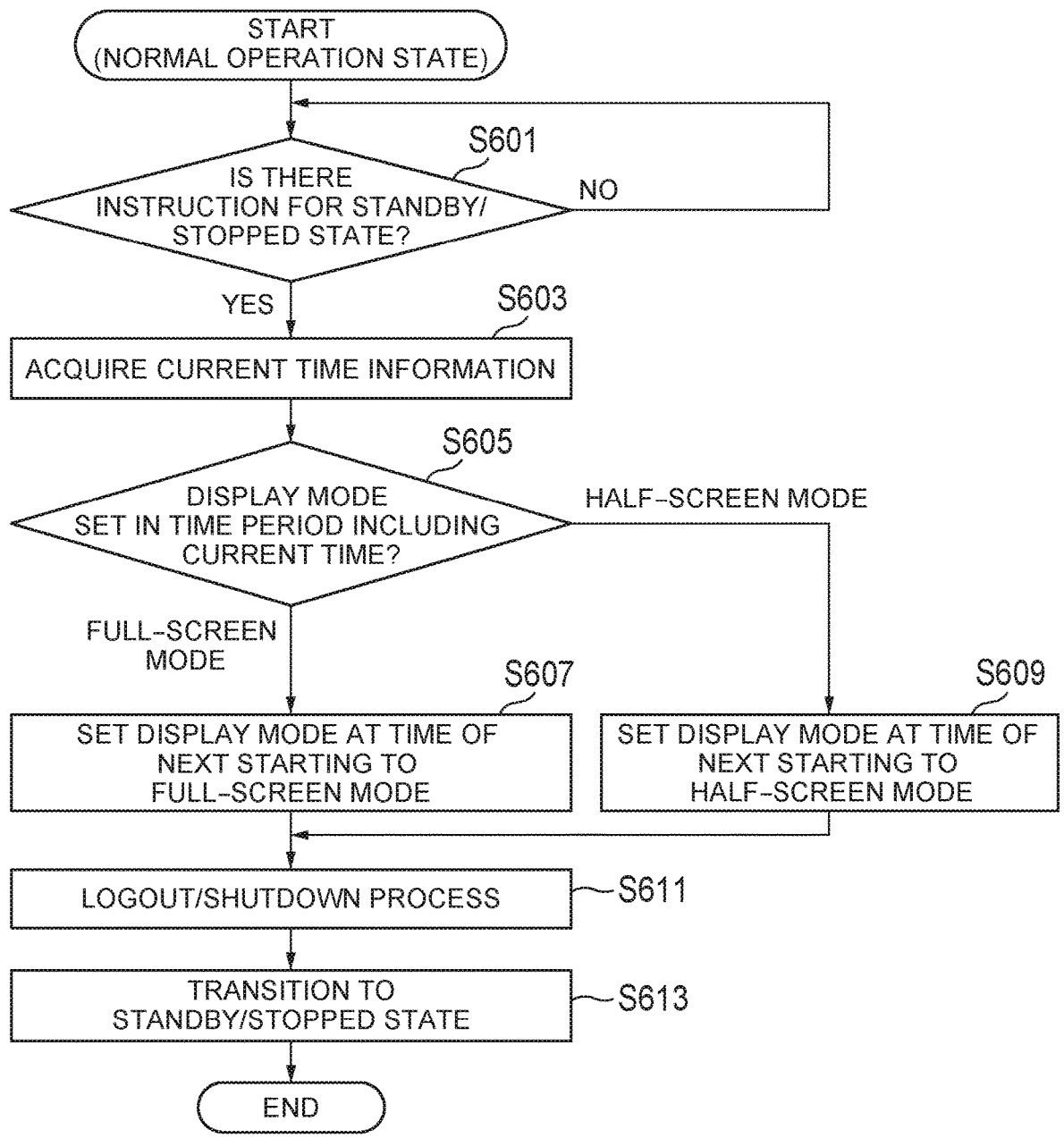
FIG. 17 is a flowchart illustrating an example of a display mode control process of setting a display mode at the time of starting according to the fourth embodiment.

FIG. 17 is a flowchart illustrating an example of a display mode control process of setting a display mode at the time of starting according to the fourth embodiment. Each process in steps S601 and S607 to S613 illustrated in FIG. 17 is the same as that in steps S401 and S407 to S413 illustrated in FIG. 12. On the other hand, the processes in steps S603 and S605 illustrated in FIG. 17 are different from the processes in steps S403 and S405 illustrated in FIG. 12.

(Step S601) The control unit 18 determines whether or not an instruction to the standby state or the stopped state has been given in the normal operation state. In a case where it is determined that an instruction for the standby state or the stopped state has been given (YES), the control unit 18 proceeds to the process in step S603. On the other hand, in a case where it is determined that an instruction for the standby state or the stopped state has not been given (NO), the control unit 18 performs the process in step S601 again.

(Step S603) The control unit 18 acquires the current time information. The flow proceeds to the process in step S605.

(Step S605) The control unit 18 determines whether or not a display mode (a display mode at the time of next starting) set in a time period including the current time is the full-screen mode or the half-screen mode on the basis of the current time information acquired in step S603 and a display mode set in advance for each time period. In a case where it is determined that the display mode is the full-screen mode, the control unit 18 proceeds to the process in step S607. On the other hand, in a case where it is determined that the display mode is the half-screen mode, the control unit 18 proceeds to the process in step S609.

(Step S607) The control unit 18 sets a display mode at the time of next starting to the full-screen mode. For example, the control unit 18 controls a display mode to be the full-screen mode such that a display mode at the time of next starting is the full-screen mode regardless of whether the current display mode is the full-screen mode or the half-screen mode. That is, the control unit 18 controls a display mode to be a resolution corresponding to the full-screen mode. The flow proceeds to the process in step S611.

(Step S609) The control unit 18 sets a display mode at the time of next starting to the half-screen mode. For example, the control unit 18 controls a display mode to be the half-screen mode such that a display mode at the time of next starting is the half-screen mode regardless of whether the current display mode is the full-screen mode or the half-screen mode. That is, the control unit 18 controls a display mode to be a resolution corresponding to the half-screen mode. The flow proceeds to the process in step S611.

(Step S611) The control unit 18 executes a system logout process or a system shutdown process, and proceeds to the process in step S613.

(Step S613) The control unit 18 causes the system to transition to the standby state or the stopped state.

The subsequent display mode control process at the time of next starting is the same as the process illustrated in FIG. 12. In a case where a display mode is controlled to be the full-screen mode in step S607 and then a state transitions to the standby state or the stopped state, the control unit 18 performs starting in the full-screen mode at the time of next starting. In a case where a display mode is controlled to be the half-screen mode in step S609 and then a state transitions to the standby state or the stopped state, the control unit 18 performs starting in the half-screen mode at the time of next starting.

As described above, in the information processing apparatus 10 according to the fourth embodiment, the control unit 18 further performs a time information acquisition process of acquiring the current time information, and selects a display mode when the next state is switched from the standby state or the stopped state to the normal operation state (at the time of starting) on the basis of the current time information and a display mode set in advance for each time period out of the full-screen mode and the half-screen mode.

As a result, the information processing apparatus 10 can automatically determine whether to perform starting in the full-screen mode or the half-screen mode according to a time period, and can thus appropriately control display on the display when the external keyboard 30 is used.

Fifth Embodiment

Next, a fifth embodiment will be described.

In the fifth embodiment, a description will be made of an aspect of obtaining an optimum solution to whether starting is performed in the full-screen mode or the half-screen mode at the time of next starting by performing machine learning by using the presence or absence of connection of the keyboard 30 used when selecting a display mode at the time of starting, a behavior of a usage form of the information processing apparatus 10, time information, and the like, in the second to fourth embodiments, as learning input data.

Since a fundamental configuration of the information processing apparatus 10 according to the fifth embodiment is the same as the configuration described with reference to FIGS. 1 to 3, and 5 in the first embodiment, the description thereof will be omitted. A functional configuration of the information processing apparatus 10 according to the fifth embodiment is partially different from the configuration illustrated in FIG. 9.

Figure 18:
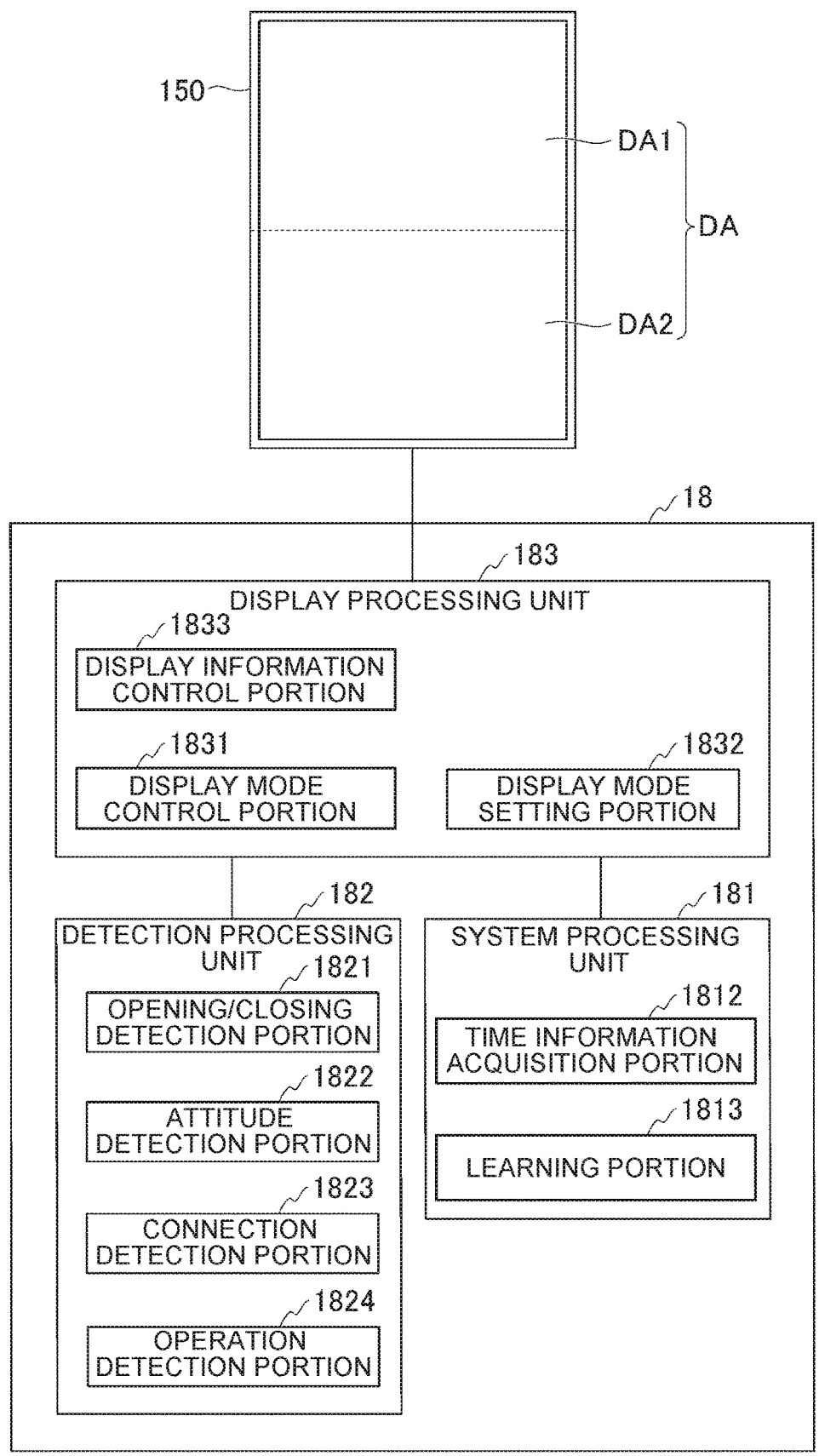
FIG. 18 is a block diagram illustrating an example of a functional configuration of an information processing apparatus according to a fifth embodiment.

FIG. 18 is a block diagram illustrating an example of a functional configuration of the information processing apparatus 10 according to the fifth embodiment. In the illustrated example, the configuration is different from the configuration illustrated in FIG. 9 in that the system processing unit 181 includes a time information acquisition portion 1812 and a learning portion 1813.

The learning portion 1813 performs machine learning of an optimum solution to a display mode at the time of starting for various behaviors in the information processing apparatus until a state becomes the standby state or the stopped state by using the presence or absence of connection of the keyboard 30 in the normal operation state, switching between display modes (switching between the full-screen mode and the half-screen mode), an orientation of the information processing apparatus 10, a folding angle (opening angle θ) of the display 50, and the current time information, and a display mode selected after logged in to the system after a state is switched from the standby state or the stopped state to the normal operation state as input learning data.

When a state is switched to the standby state or the stopped state, the display mode control portion 1831 selects an optimum solution to a display mode at the time of starting for the presence or absence of connection of the keyboard 30 up to that point, switching between display modes (switching between the full-screen mode and the half-screen mode), an orientation of the information processing apparatus 10, a folding angle (opening angle θ) of the display 50, the current time information, and the like, by using a trained model subjected to machine learning in the learning portion 1813.

As the learning input data for machine learning, at least any of the presence or absence of connection of the keyboard 30, switching between display modes (switching between the full-screen mode and the half-screen mode), an orientation of the information processing apparatus 10, a folding angle (opening angle θ) of the display 50, and the current time information may be used.

Figure 19:
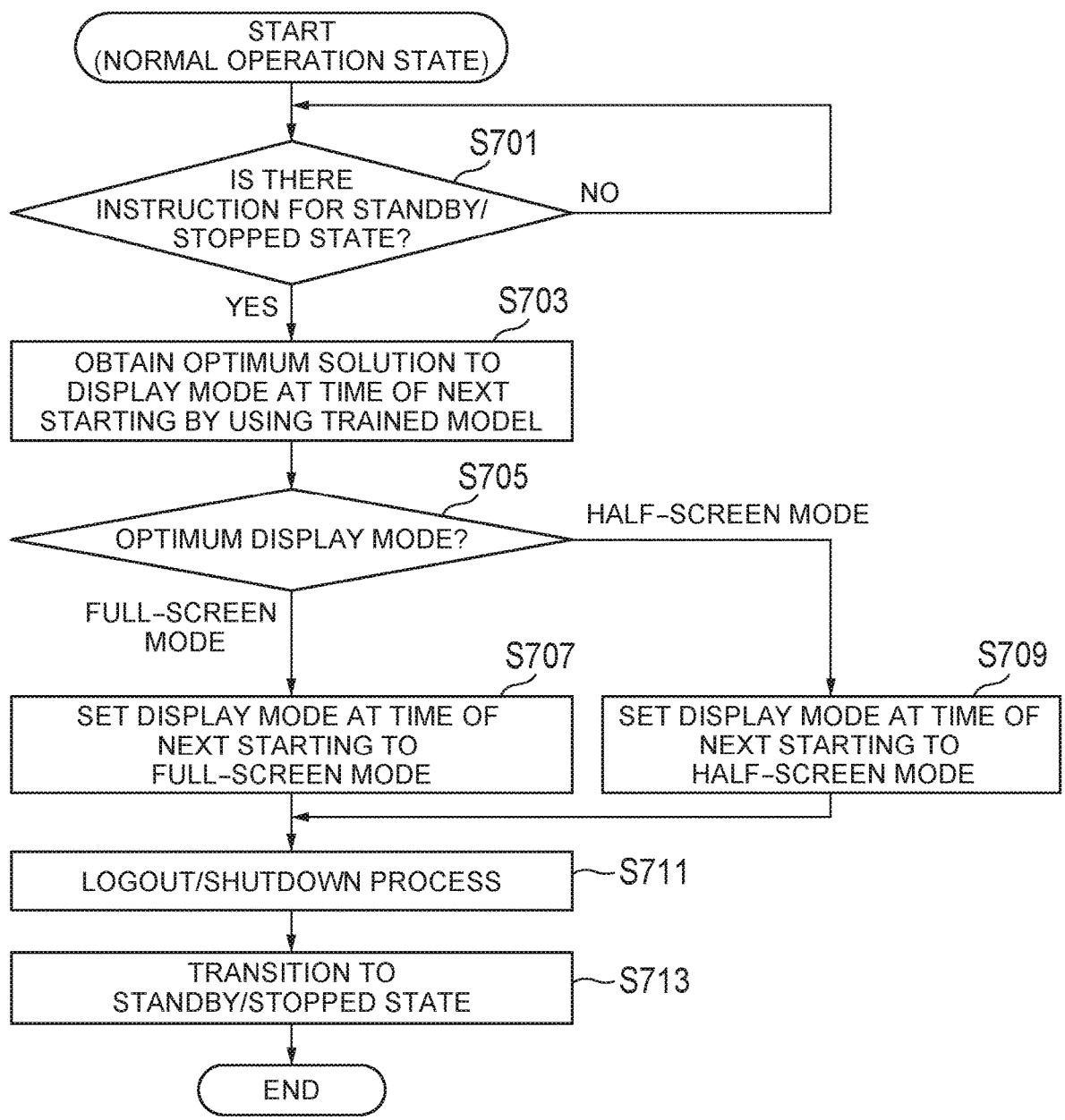
FIG. 19 is a flowchart illustrating an example of a display mode control process of setting a display mode at the time of starting according to the fifth embodiment.

FIG. 19 is a flowchart illustrating an example of a display mode control process of setting a display mode at the time of starting according to the fifth embodiment. Each process in steps S701 and S707 to S713 illustrated in FIG. 19 is the same as that in steps S701 and S707 to S713 illustrated in FIG. 12. On the other hand, the processes in steps S703 and S705 illustrated in FIG. 19 are different from the processes in steps S403 and S405 illustrated in FIG. 12.

(Step S701) The control unit 18 determines whether or not an instruction to the standby state or the stopped state has been given in the normal operation state. In a case where it is determined that an instruction for the standby state or the stopped state has been given (YES), the control unit 18 proceeds to the process in step S703. On the other hand, in a case where it is determined that an instruction for the standby state or the stopped state has not been given (NO), the control unit 18 performs the process in step S701 again.

(Step S703) The control unit 18 obtains an optimum solution to a display mode at the time of next starting by using a trained model. The flow proceeds to the process in step S705.

(Step S705) The control unit 18 determines whether the optimum display mode at the time of next starting is the full-screen mode or the half-screen mode. In a case where it is determined that the display mode is the full-screen mode, the control unit 18 proceeds to the process in step S707. On the other hand, in a case where it is determined that the display mode is the half-screen mode, the control unit 18 proceeds to the process in step S709.

(Step S707) The control unit 18 sets a display mode at the time of next starting to the full-screen mode. For example, the control unit 18 controls a display mode to be the full-screen mode such that a display mode at the time of next starting is the full-screen mode regardless of whether the current display mode is the full-screen mode or the half-screen mode. That is, the control unit 18 controls a display mode to be a resolution corresponding to the full-screen mode. The flow proceeds to the process in step S711.

(Step S709) The control unit 18 sets a display mode at the time of next starting to the half-screen mode. For example, the control unit 18 controls a display mode to be the half-screen mode such that a display mode at the time of next starting is the half-screen mode regardless of whether the current display mode is the full-screen mode or the half-screen mode. That is, the control unit 18 controls a display mode to be a resolution corresponding to the half-screen mode. The flow proceeds to the process in step S711.

(Step S711) The control unit 18 executes a system logout process or a system shutdown process, and proceeds to the process in step S713.

(Step S713) The control unit 18 causes the system to transition to the standby state or the stopped state.

The subsequent display mode control process at the time of next starting is the same as the process illustrated in FIG. 12. In a case where a display mode is controlled to be the full-screen mode in step S707 and then a state transitions to the standby state or the stopped state, the control unit 18 performs starting in the full-screen mode at the time of next starting. In a case where a display mode is controlled to be the half-screen mode in step S709 and then a state transitions to the standby state or the stopped state, the control unit 18 performs starting in the half-screen mode at the time of next starting.

As described above, in the information processing apparatus 10 according to the fifth embodiment, the control unit 18 selects a display mode when a state is switched from the standby state or the stopped state to the normal operation state (at the time of starting) by using a trained model subjected to machine learning on the basis of at least any information of the presence or absence of connection of the keyboard 30 (whether or not the keyboard 30 is placed) in the normal operation state, switching between display modes (switching between the full-screen mode and the half-screen mode), an orientation of the information processing apparatus 10, a folding angle (opening angle θ) of the display 150, and the current time information, and a display mode selected after logged in to the system after a state is switched from the standby state or the stopped state to the normal operation state out of the full-screen mode and the half-screen mode.

As a result, the information processing apparatus 10 can select a display mode suitable for a user out of the full-screen mode and the half-screen mode as a display mode at the time of next starting according to a usage status so far when the user performs a logout or shutdown process, and can thus appropriately control display on the display when the external keyboard 30 is used.

The learning portion 1813 is not limited to the prior learning, and may perform dynamic learning for additional learning by feeding back a display mode controlled by using the trained model. For example, the learning portion 1813 may perform additional machine learning on the trained model on the basis of a switching status of display modes after a state is switched from the standby state or the stopped state to the normal operation state in the display mode controlled by using the trained model when a state is switched from the normal operation state to the standby state or the stopped state. The subsequent switching status is, for example, whether the display mode controlled by using the trained model is maintained without any change, or whether the display mode is immediately switched to another display mode by the user. For example, in a case where the display mode controlled by the display mode control portion 1831 by using the trained model is switched to another display mode within a predetermined time, the learning portion 1813 may perform additional learning assuming that the display mode after switching is a suitable display mode.

Although the one or more embodiments of the present invention have been described in detail with reference to the drawings above, a specific configuration is not limited to the above-described configuration, and various design changes and the like can be made without departing from the concept of the present invention. For example, the configurations described in each of the above one or more embodiments may be freely combined.

In the above one or more embodiments, an example has been described in which by default in the two-screen mode, the first screen region DA1 is used as a primary screen and the second screen region DA2 is used as a secondary screen, and in the inverted two-screen mode, the second screen region DA2 is used as a primary screen and the first screen region DA1 is used as a secondary screen, but a correspondence relationship between the primary screen and the secondary screen may be reversed. That is, by default in the two-screen mode, the second screen region DA2 may be used as a primary screen and the first screen region DA1 may be used as a secondary screen, and in the inverted two-screen mode, the first screen region DA1 may be used as a primary screen and the second screen region DA2 may be used as a secondary screen.

In the above-described one or more embodiments, the example of the one-screen mode in which the screen region of the display 150 is controlled to be displayed as one screen region DA and the two-screen mode in which the screen region is controlled to be divided into and displayed as two screen regions such as the first screen region DA1 and the second screen region DA2 has been described, but in a case where the screen region of the display 150 is divided, the present invention is not limited to dividing the screen region into two screen regions, and the screen region may be divided into three or more screen regions. For example, even in a case of a three-screen mode in which the screen region of the display 150 is controlled to be divided into three screen regions and displayed, display data to be displayed in each of the three screen regions does not have to be replaced and a display orientation of each of the three screen regions may be changed according to rotation of the display 150.

In the above one or more embodiments, the example in which one foldable display 150 is used in the one-screen mode and the two-screen mode has been described, but two displays may be used. For example, a one-screen mode in which respective screen regions (screen regions) of the two displays are controlled to be combined and displayed as a screen region (screen region) and a two-screen mode in which display of each screen region (screen region) of the two displays is individually controlled may be used. The processing in each of the above one or more embodiments may be applied as a half-screen mode in which only one of the two displays is targeted for display and the other is controlled to be displayed black or turned off.

In the above one or more embodiments, an example of a touch operation on a plurality of touch panel type displays in which an input unit (touch sensor) and a display unit are integrally configured has been described, but the present invention is limited to the touch operation, and a click operation using a mouse, an operation using a gesture, or the like may be performed.

The information processing apparatus 10 described above has a computer system inside. The process in each configuration of the information processing apparatus 10 described above may be performed by recording a program for realizing the functions of each configuration included in the above-described information processing apparatus 10 on a computer-readable recording medium and reading and executing the program recorded on the recording medium with a computer system. Here, "reading and executing the program recorded on the recording medium with the computer system" includes installing the program in the computer system. The term "computer system" as stated herein includes hardware such as an OS and peripheral devices. The "computer system" may include a plurality of computer devices connected via a network including a communication line such as the Internet, a WAN, a LAN, and a dedicated line. The "computer-readable recording medium" is a portable medium such as a flexible disk, a magneto-optical disk, a ROM, or a CD-ROM, and a storage device such as a hard disk built into the computer system. As described above, the recording medium that stores the program may be a non-transitory recording medium such as a CD-ROM.

The recording medium also includes an internal or external recording medium accessible from a distribution server in order to distribute the program. The program may be divided into a plurality of programs, downloaded at different timings, and then combined with each configuration included in the information processing apparatus 10, or distribution servers for distributing the respective divided programs may be different. The "computer-readable recording medium" includes a medium that stores the program for a certain period of time, such as a volatile memory (RAM) inside a computer system that serves as a server or a client in a case where the program is transmitted via a network. The above program may be a program for realizing some of the above functions. The program may be a so-called difference file (difference program) in which the above functions can be realized in combination with a program already recorded in the computer system.

Some or all of the functions of the information processing apparatus 10 in the above-described one or more embodiments may be realized by an integrated circuit such as a large scale integration (LSI). Each function may be individually realized as a processor, and some or all of the functions may be integrated into a processor. A method of forming an integrated circuit is not limited to the LSI, and may be realized by a dedicated circuit or a general-purpose processor. In a case where an integrated circuit technology that replaces an LSI will appear due to advances in semiconductor technology, an integrated circuit on the basis of the technology may be used.

DESCRIPTION OF SYMBOLS 10 information processing apparatus
101 first chassis
102 second chassis
103 hinge mechanism
11 communication unit
12 RAM
13 storage unit
14 speaker
15 display unit
16 camera
150 display
155 touch sensor
161 first acceleration sensor
162 second acceleration sensor
17 hall sensor
18 control unit
181 system processing unit
1811 estimation portion
1812 time information acquisition portion
1813 learning portion
182 detection processing unit
1821 opening/closing detection portion
1822 attitude detection portion 1823 connection detection portion
183 display processing unit
1831 display mode control portion
1832 display mode setting portion
1833 display information control portion

What is claimed is:

1. An information processing apparatus comprising:
   one foldable display;
   a memory that temporarily stores a program of a system; and
   a processor that performs control based on the system by executing the program of the system stored in the memory, wherein
   the processor performs
      an operation state control process of switching an operation state of the system between a first operation state and a second operation state in which some or all of processes executed by the system are restricted more than in the first operation state,
      a placement determination process of determining whether an external keyboard to be placed on a predetermined screen region of a screen region of the display is placed,
      a first control process of providing a first display mode in which an entire screen region of the display is controlled to be displayed as a display region, and a second display mode in which a part of the screen region of the display excluding the predetermined screen region is controlled to be displayed as a display region, and, in the first operation state, controlling a display mode to be the first display mode in a case of a non-placed state in which the keyboard is not placed and controlling a display mode to be the second display mode in a case of a placed state in which the keyboard is placed, and
      a second control process of, when a state is switched from the first operation state to the second operation state, selecting and controlling a display mode when a next state is switched from the second operation state to the first operation state from among the first display mode, the second display mode, and a previous display mode out of the first display mode and the second display mode.

2. The information processing apparatus according to claim 1, wherein the processor
   further performs a display information control process of displaying, on the display, a selection screen for allowing a user to select a display mode selected in the second control process based on any of a first setting for setting the first display mode, a second setting for setting the second display mode, and a third setting for setting a previous display mode out of the first display mode and the second display mode, and
   selects, in the second control process, the display mode when the next state is switched from the second operation state to the first operation state based on a setting selected through the user's operation on the selection screen from among the first setting, the second setting, and the third setting.

3. The information processing apparatus according to claim 1, wherein the processor
   further performs a placement state accumulation process of determining whether the keyboard is in the placed state or the non-placed state and accumulates determination results to be stored each time a state is switched from the second operation state to the first operation state, and
   selects, in the second control process, as the display mode when the next state is switched from the second operation state to the first operation state, the second display mode in a case where a cumulative value of the placed state is greater than a cumulative value of the non-placed state, and selects the first display mode in a case where the cumulative value of the non-placed state is greater than the cumulative value of the placed state.

4. The information processing apparatus according to claim 1, further comprising:
   a first sensor that detects an orientation of the information processing apparatus; and
   a second sensor that detects a folding angle of the display, wherein
   the processor
      further performs an estimation process of, when a state is switched from the first operation state to the second operation state, estimating a tendency when a user uses the information processing apparatus based on at least any of whether the keyboard is in a placed state before the switching, and switching between the first display mode and the second display mode, the orientation of the information processing apparatus, and the folding angle of the display, and
      selects, in the second control process, a display mode when a next state is switched from the second operation state to the first operation state based on the tendency estimated in the estimation process.

5. The information processing apparatus according to claim 1, wherein the processor
   further performs a time information acquisition process of acquiring current time information, and
   selects, in the second control process, a display mode when a next state is switched from the second operation state to the first operation state based on the current time information and a display mode set in advance for each time period out of the first display mode and the second display mode.

6. The information processing apparatus according to claim 1, further comprising:
   a first sensor that detects an orientation of the information processing apparatus; and
   a second sensor that detects a folding angle of the display, wherein
   the processor selects a display mode when a next state is switched from the second operation state to the first operation state by using a trained model that is subjected to machine learning based on at least any information of whether the keyboard is in a placed state in the first operation state, switching between the first display mode and the second display mode, the orientation of the information processing apparatus, the folding angle of the display, and current time information, and a display mode selected after log in to the system after a state is switched from the second operation state to the first operation state out of the first display mode and the second display mode.

7. The information processing apparatus according to claim 6, wherein
   the processor performs additional machine learning on the trained model based on a status of switching between display modes after a state is switched from the second operation state to the first operation state in a display mode controlled when a previous state is switched from the first operation state to the second operation state.

8. The information processing apparatus according to claim 1, wherein
when a state is switched from the second operation state to the first operation state, the processor controls display on the display in a display mode controlled when a previous state is switched from the first operation state to the second operation state.

9. A control method in an information processing apparatus including one foldable display, a memory that temporarily stores a program of a system, and a processor that performs control based on the system by executing the program of the system stored in the memory, the control method comprising:
causing the processor to execute
a step of switching an operation state of the system between a first operation state and a second operation state in which some or all of processes executed by the system are restricted more than in the first operation state;
a step of determining whether an external keyboard to be placed on a predetermined screen region of a screen region of the display is placed;
a step of providing a first display mode in which an entire screen region of the display is controlled to be displayed as a display region, and a second display mode in which a part of the screen region of the display excluding the predetermined screen region is controlled to be displayed as a display region, and, in the first operation state, controlling a display mode to be the first display mode in a case of a non-placed state in which the keyboard is not placed and controlling a display mode to be the second display mode in a case of a placed state in which the keyboard is placed; and
a step of, when a state is switched from the first operation state to the second operation state, selecting and controlling a display mode when a next state is switched from the second operation state to the first operation state from among the first display mode, the second display mode, and a previous display mode out of the first display mode and the second display mode.

* * * * *